(12) United States Patent
Ichimura

(10) Patent No.: US 6,573,926 B1
(45) Date of Patent: Jun. 3, 2003

(54) METHOD FOR DISTRIBUTING DOCUMENTS IN CONFERENCE SYSTEM

(75) Inventor: Shigehiro Ichimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/336,994

(22) Filed: Jun. 21, 1999

(30) Foreign Application Priority Data

Jun. 30, 1998 (JP) .......................................... 10-199618

(51) Int. Cl.[7] .............................................. H04N 7/14
(52) U.S. Cl. .................................... 348/14.08; 709/205
(58) Field of Search ............... 348/14.01, 14.08–14.12; 379/93.08, 93.21; 709/205; 345/753

(56) References Cited

U.S. PATENT DOCUMENTS 5,764,279 A * 6/1998 Ford et al. ................ 348/14.08
5,996,003 A * 11/1999 Namikata et al. .......... 709/205

FOREIGN PATENT DOCUMENTS

| JP | 4-167788 | 6/1992 |
|----|----------|--------|
| JP | 7-321932 | 12/1995 |
| JP | 7-322230 | 12/1995 |
| JP | 8-317367 | 11/1996 |
| JP | 10-51558 | 2/1998 |

* cited by examiner

Primary Examiner—Wing Chan
(74) Attorney, Agent, or Firm—Whitham, Curtis & Christofferson, PC

(57) ABSTRACT

In a conference system, documents such as conference records used in the conference can be made to distribute efficiently without obstructing transmission of the real-time data such as cine image data. Hence, a broadcasting network 8 is provided in addition to communication lines 5, 6, and 7 connecting conference terminals 2, 3, and 4 used by users participating in the conference and a conference control device 1 with a function of distributing real-time data such as cine image data transmitted from the conference terminals 2, 3, and 4 to the other conference terminals 2, 3, and 4 participating in the conference, and each of the conference terminals 2, 3, and 4 is connected to the broadcasting network 8. The conference terminals 2 distributing the conference records to the other conference terminals 3, 4 distributes the conference records to the other destination conference terminals 3, 4 with broadcasting communication through the broadcasting network 8.

5 Claims, 18 Drawing Sheets

| Header for participation permissive notification | Participant identifier |
|---|---|

FIG.5

| Header for new participation notification | Participant identifier |
|---|---|

FIG.6

METHOD FOR DISTRIBUTING DOCUMENTS IN CONFERENCE SYSTEM

CROSS REFERENCE TO RELATED APPLICATIONS

The present invention claims priority from Japanese Patent Application No. 10-19961 filed Jun. 30, 1998, the contents of which are incorporated herein by reference.

BACKGROUND OF THE INVENTION

1. Field of the Invention

The present invention relates generally to a conference system which utilizes a computer, and more particularly to a method for distributing documents which are used in the conference to each user who participates in the conference.

2. Description of Related Art

In a conference system which utilizes a computer such as a video conferencing system, there are forms in which conference terminals (hereinafter referred to merely as terminals) used by users are directly connected through a circuit and are indirectly connected through a conference control device such as an MCU (multi-point connection device). The conference systems of either form are constituted so that a plurality of users existing in remote places can advance a conference while looking at expressions of the other faces each other and hearing other voices byte distributing real-time data (such as cine image data and voice data which are required for holding a conference in real-time) transmitted from each terminal to other terminals. In addition, such conference systems are constituted so that not only real-time data such as cine images and voices but also information such as documents and still images which are required to advance a conference can be transmitted. The present invention relates particularly to a method for distributing conference records in a conference system of a form in which a plurality of terminals are connected through a conference control device.

As is conventional, in a conference system of the form in which a plurality of terminals are connected through a conference control device, as shown, for example, in Japanese Patent Laid-Open Publication No. Hei 7-322230, documents transmitted from each terminal are made to be distributed to other terminals through the conference control device, and also the conference records are distributed using the same circuit as that used for transmission of real-time data. Similar technique has been disclosed in the columns of Detailed Description of the Invention in Japanese Patent Laid-Open Publications No. Hei 4-167788 and No. Hei 10-51558. In particular, the former publication shows a conception of broadcasting the conference records from the conference control device to a plurality of terminals, and the latter publication discloses an idea in which the conference records have been collected in the conference control device prior to the start of the conference and, each time when a terminal to be participated in the conference is occurred, the conference records are separately distributed from the conference control device to the terminal. However, both publications distribute the conference records using the same circuit as that used to transmit the real-time data.

Incidentally, in the form of a conference system in which a plurality of terminals are directly connected, the conference control device is not included, so that each terminal directly distributes the conference records to other terminals. The literature disclosing such techniques includes Japanese Patent Laid-Open Publications No. Hei 7-321932 and No. Hei 4-167788 (included in the column of Description of the Related Arts). In particular, the former publication discloses an idea such that a particular terminal is made a chairperson terminal which accumulates the conference records from other terminals and then distributes them separately to each terminal, and latter publication shows a conception such that each terminal distributes the conference records to a plurality of terminals by broadcasting. However, both publications distributes the conference records using the same circuit as that used for transmission of the real-time data.

As described above, a conventional conference system distributes the conference records using the same circuit as that used for transmission of the real-time data such as cine image data and voice data. For this reason, there were problems that, when the conference records with large amount of information were distributed, circuit traffic was increased, thereby obstructing transmission of the real-time data such as cine image data and voice data to cause a smooth advance of a conference to be difficult.

SUMMARY OF THE INVENTION

Consequently, it is a first object of the present invention to provide a novel method for distributing documents in which the conference records are made to be distributed using a different circuit from transmission of real-time data.

In addition, a conventional conference system of a form in which a plurality of terminals are connected through a conference control device adopts such a configuration that the conference records are always distributed by passing through the conference control device, so that the amount of processing in the conference control device tends to be increased, thereby obstructing transmission of the real-time data to cause a smooth advance of a conference to be difficult.

Thus, it is a second object of the present invention to provide a novel method for distributing documents in which the distribution of the conference records of each terminal is made to be performed without passing through the conference control device.

Further, although there is an idea itself in the prior art in which a broadcast communication is used in distribution of the conference records, an efficient distributing method in a case when a new participant joins during broadcast communication has not been proposed at all.

Accordingly, it is a third object of the present invention to provide an efficient method for distributing documents in which an entire amount of broadcast communication can be reduced as small as possible when a new participant joins during broadcast communication.

A method for distributing documents in the conference system according to the present invention, in the method for distributing documents in the conference system of a form in which conference terminals used by users who participate in a conference and conference control device with a function of distributing real-time data such as cine image data and voices transmitted from the conference terminals to the other conference terminals participating in the conference are connected through first communication lines, is characterized in that broadcasting devices are provided in each of the conference terminals and these broadcasting devices are connected by second communication lines different from the first communication lines, and in that the conference terminals distributing conference records to the other conference terminals distribute the conference records to other destination conference terminals by a broadcast using the broadcasting devices.

In addition, the conference terminal distributing conference records to the other conference terminals is characterized in that, when it receives a notification of a new participant from the conference control device while it is distributing the conference records one by one to the known participants with a broadcast, it continues distribution processing with including the new participant as a destination for subsequent distribution documents, and at the time when it completes the broadcast of the last conference records, it broadcasts the conference records broadcast before the new participant joined to the new participant in turn.

BRIEF DESCRIPTION OF THE DRAWINGS

The preferred embodiments of this invention will be described in detail, with reference to the following figures, wherein:

FIG. 5 is a diagram showing an example of a format of a participation permissive notification;

FIG. 6 is a diagram showing an example of a format of a new participation notification;

DETAILED DESCRIPTION OF THE PREFERRED EMBODIMENTS

Figure 1:
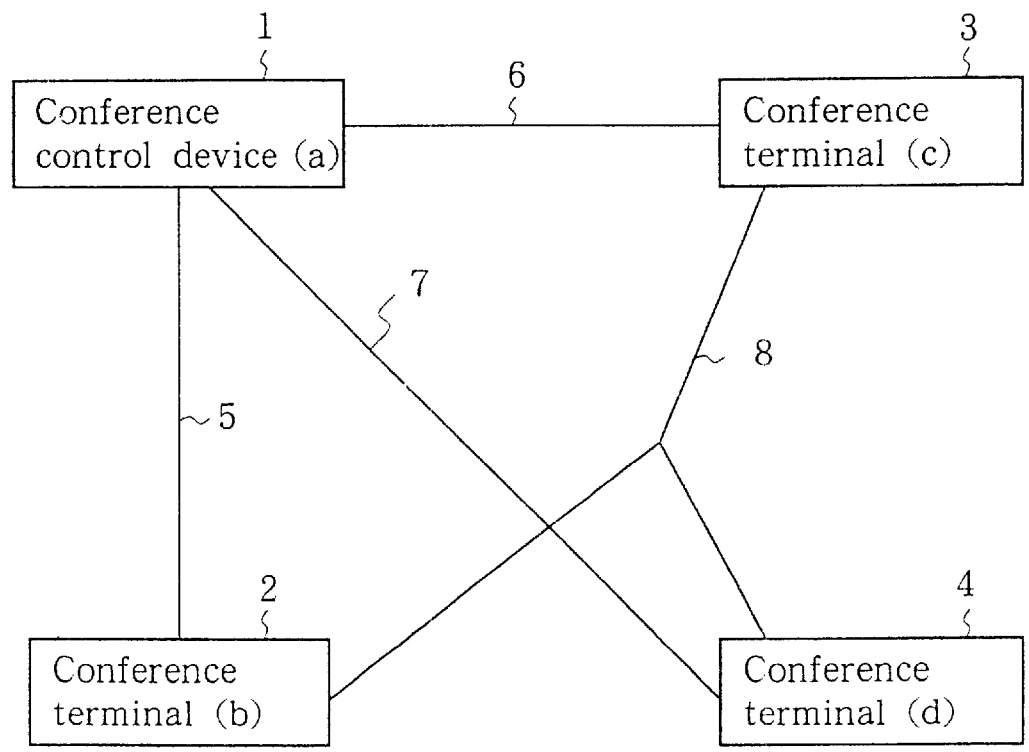
FIG. 1 is a block diagram showing one example of the conference system according to the present invention.

Referring to FIG. 1, one embodiment of the conference system according to the present invention is composed of a conference control device 1, three terminals (conference terminals) 2, 3, and 4, communication lines 5, 6, and 7 connecting the conference control device 1 and the terminals 2, 3, and 4, respectively, and a broadcasting network 8 connecting the terminals 2, 3, and 4. Incidentally, number of terminals is not limited to this embodiment.

The communication lines 5, 6, and 7 are, for example, a public telephone exchange network, a public ISDN (Integrated Service Digital Network), or the like.

The broadcasting network 8 is, for example, a LAN (Local Area Network) due to Ethernet. Of course, a broadcasting network due to radio communication or broadcasting using a satellite can also be used.

In the conference system shown in FIG. 1, when terminals 2, 3, and 4 are participating in a same conference through the conference control device 1, real-time data such as cine image data and voice data transmitted from the terminals 2, 3, and 4 to the communication lines 5, 6, and 7 are temporally received by the conference control device 1 and then transmitted to each of the terminals 2, 3, and 4 through the communication lines 5, 6, and 7 to be displayed on monitors of the terminals 2, 3, and 4 and regenerated and output from speakers. Further, conference records such as still images and documents required for the progress of the conference are broadcast directly from the terminals of users intending to present the documents to the conference to the terminals of other participants through the broadcasting network 8.

The arrangements of the conference control device 1 and the terminals 2, 3, and 4 will be described hereinafter.

Figure 2:
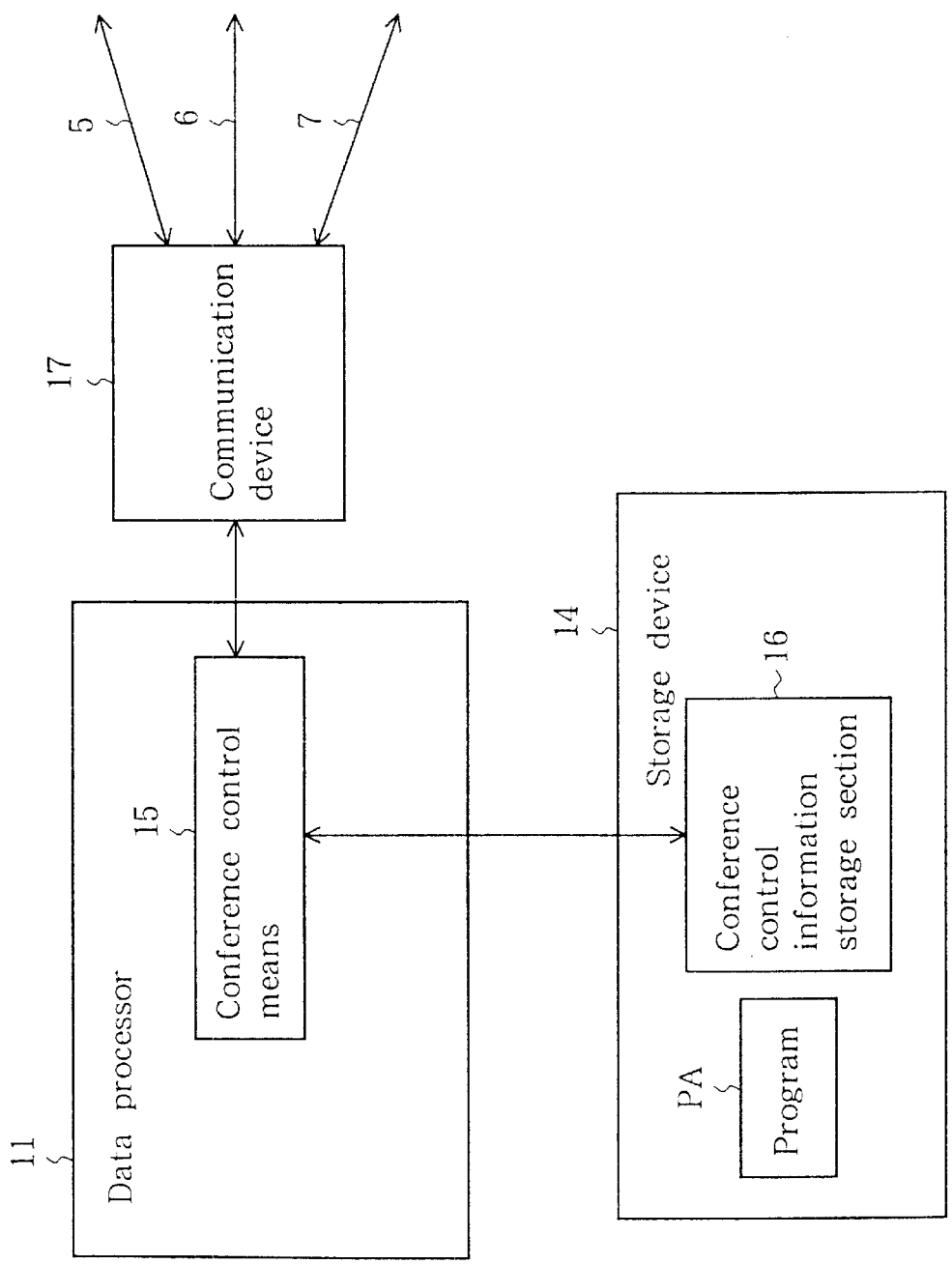
FIG. 2 is a block diagram showing an arrangement of a conference control device.

FIG. 2 is a block diagram showing an arrangement of the conference control device 1. The conference control device 1 of this embodiment is composed of a data processor 11, a storage device 14, and a communication device 17.

The storage device 14 is composed of a RAM (Random-Access Memory), a magnetic disk device, and the like, and stores a program PA executed in the data processor 11 and a variety of control data. The program PA stored in the storage device 14 is read out by the data processor 11 when the conference control device 1 is booted up and activated, and a conference control means 15 is materialized on the data processor 11 by controlling the operation of the data processor 11.

The communication device 17 is provided with functions of transmitting information sent from the conference control means 15 on the data processor 11 to the terminals 2, 3, and 4 using the communication lines 5, 6, and 7 and transmitting information received from the terminals 2, 3, and 4 through the communication lines 5, 6, and 7 to the conference control means 15.

One conference control means 15 is provided for each conference. Accordingly, when a plurality of different conferences are held, the conference control means 15 per each conference exist on the data processor 11. The conference control means 15 controls a conference, such as control of information in the conference, such that it retains setting information such as who is a chairperson of the conference in the users or whether or not there is a chairperson, transmits the data input by a user participating the conference to the terminal used by the designated user, and assigns data transmitting right to each user. In particular, as a control associated with distribution of the documents, it attaches a user identifier to a user newly participating in the conference and performs processing of a participation permissive notification and a midstream participation notification to users. A flow chart for processing this conference control means is shown in FIG. 3, and an arrangement of a conference control information storage section 16 (refer to FIG. 2), used for its processing, on the storage device 14 is shown in FIG. 4.

Figure 4:
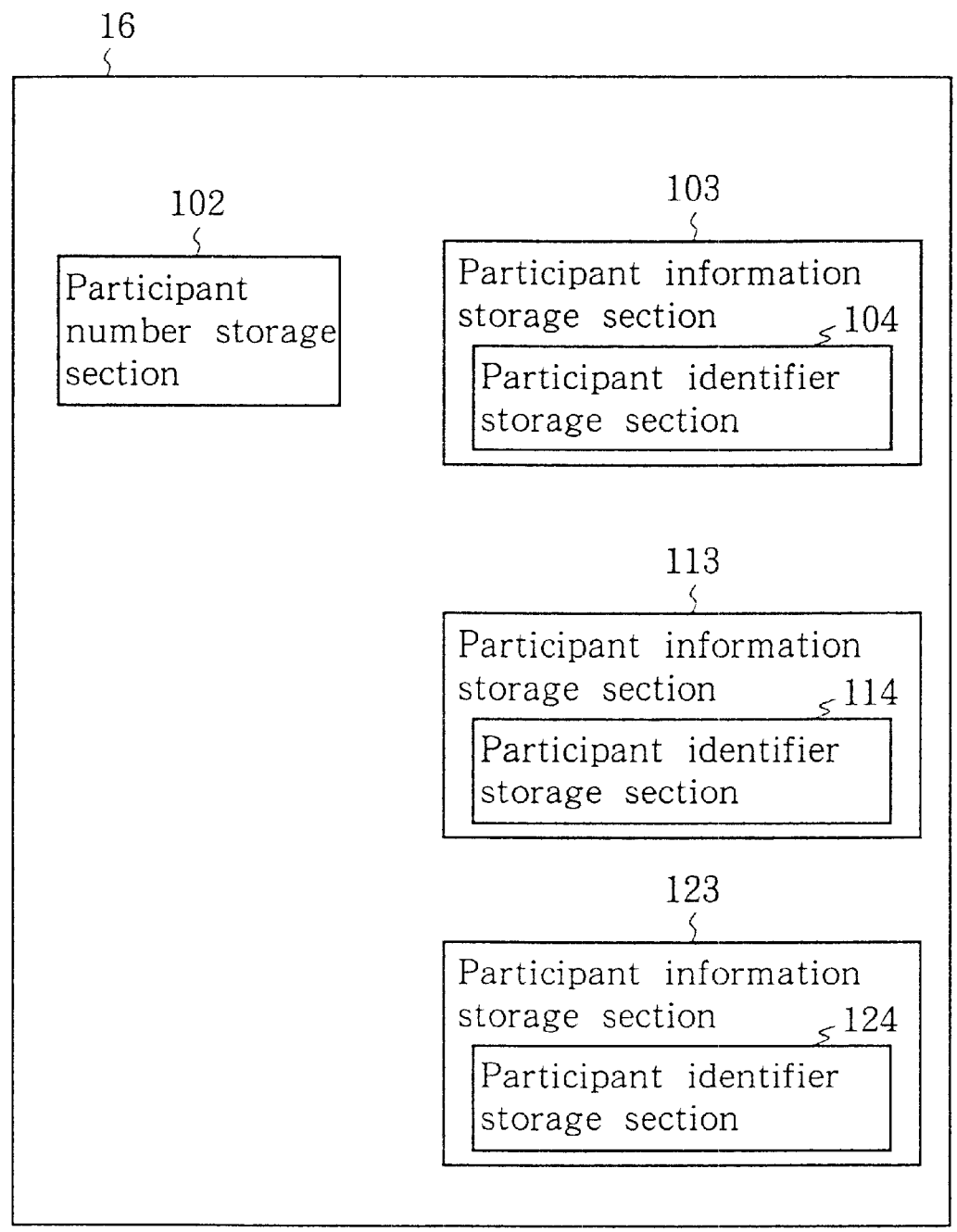
FIG. 4 is a diagram showing an arrangement of a conference control information storage section.

Referring first to FIG. 4, the conference control information storage section 16 is provided with a participant number storage section 102 and a participant information storage section whose number is equal to the current participant number. In the example of the figure, since there are now three participants, three participant information storage sections 103, 113, and 123 are provided. Each participant information storage sections 103, 113, and 123 includes participant identifier storage sections 104, 114, and 124, in which identifiers of participants are stored.

Figure 3:
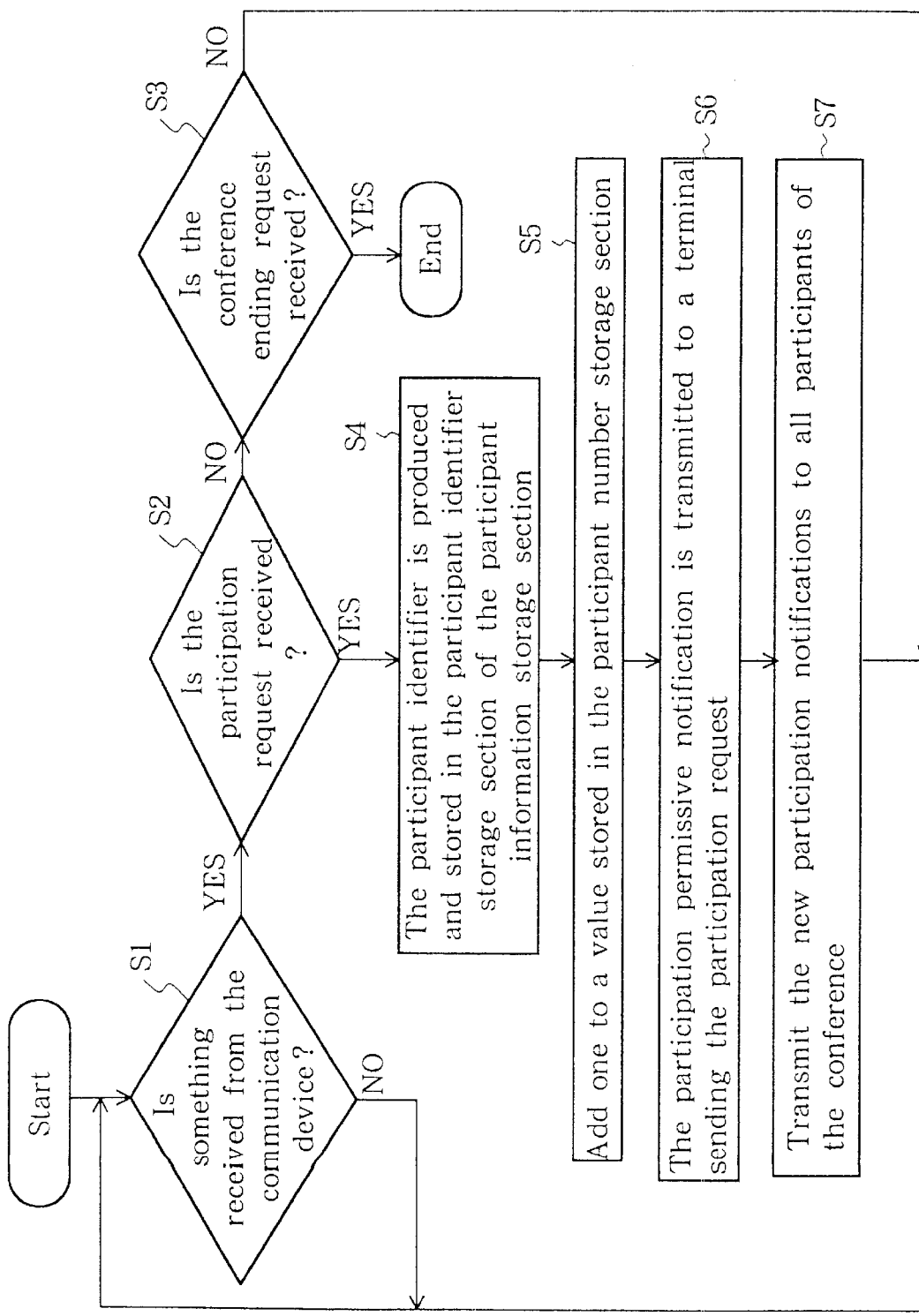
FIG. 3 is a flow chart showing a processing example of a conference control means in the conference control device.

Referring to FIG. 3, each time the conference control means 15 receives any information from the communication device 17 after started (Yes in step S1), it is judged whether the received information is a participation request or a conference ending request from the terminal (steps S2, S3). If it is the participation request, a participant identifier is produced to this participant, one participant information storage section (for example, 103) is secured in the conference control information storage section 16, and the produced participant identifier is stored in the participant identifier storage sections 104 of the participant information storage section (step S4). If the produced participant identifier enables all participants who are attending the conference to identify the entire participants, any identifier may be allowable. Then, the conference control means 15 adds one to a value (initial value is zero) preserved in the participant number storage section 102 (step S5), and transmits the participation permissive notification including the participant identifier to the terminal which has sent the participation request this time (step S6). FIG. 5 shows an example of a format of the participation permissive notification, which is composed of a header, indicating that this notification is the participation permissive notification, and a participant identifier. Here, when the participant is the first one, only the participant identifier produced to the participant is notified, and when the participant is the second or subsequent, the participant identifier produced to the participant and also the participant identifiers of the participants already attending the conference are notified. Next, if the new participant is not the first one for the conference, the conference control means 15 transmits new participation notifications including the participant identifier of the new participant to the terminals of all participants already attending the conference (step S7). FIG. 6 is an example of a format of the new participation notification, which is composed of a header indicating that the notification is the new participation notification and a participant identifier of a new participant. On the other hand, if the received information is a conference ending request (Yes, in step S3), the conference control means 15 completes the processing.

Figure 7:
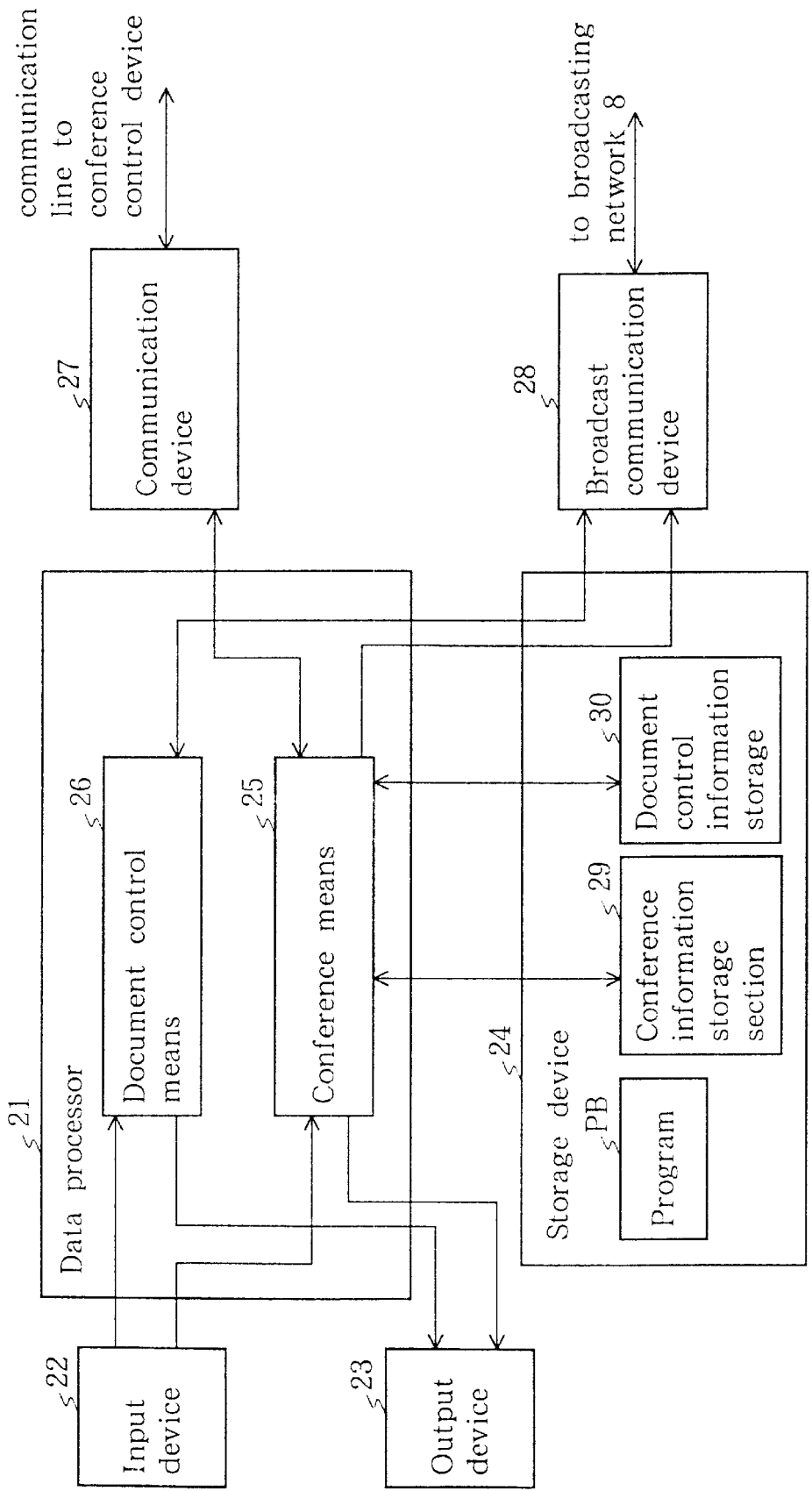
FIG. 7 is a block diagram showing an arrangement of a conference terminal.

FIG. 7 is a block diagram showing an arrangement of the terminals 2, 3, and 4. All of the terminals 2, 3, and 4 have the same configuration, and are composed of a data processor 21, an input device 22, an output device 23, a storage device 24, a communication device 27, and broadcasting device 28.

The input device 22 consists of a keyboard entering input data from a user, a microphone inputting voices of the user, and a video camera taking a photograph of faces of the users.

The output device 23 consists of a display device for displaying the faces of the users attending the conference and conference records, a printing device for printing the conference records, and a speaker for outputting voices of the users.

The storage device 24 is constituted of a RAM (Random-Access Memory), a magnetic disk device and the like, and stores a program PB executed in the data processor 21 and a variety of information data. The program PB stored in the storage device 24 is read out by the data processor 21 when the terminal is booted up and activated, and a conference means 25 and a document control means 26 are materialized on the data processor 21 by controlling the operation of the data processor 21.

The communication device 27 is provided with functions of transmitting information sent from the conference means 25 or the document control means 26 on the data processor 21 to the conference control device 1 using the communication line between the communication device 27 and the conference control device 1, transmitting information received from the conference control device 1 to the conference means 25 or the document control means 26 using the same line, and transmitting information sent from the conference means 25 to the document control means 26 or information sent from the document control means 26 to the conference means 25 to the respective means.

The broadcasting device 28 is provided with functions of broadcasting the conference records sent from the document control means 26 to the other terminals using the broadcasting network 8 and receiving the conference records broadcast from other terminals through the broadcasting network 8 to transmit them to the document control means 26.

The conference means 25 controls the entire management of the conference in this terminal side. For example, it controls the input device 22 and the output device 23 to provide a user interface to a user, and it establishes a communication path through the communication line between the conference means 25 and the conference control means 15 in the side of the conference control device 1. It displays the number and profiles of the participants currently attending the conference and a list of the documents in the conference terminal for the user by transmitting and receiving data using the communication path. In addition, it exchanges data such as the voices and face images in real-time with the conference means in other terminals, and further displays the documents and transmits blows and corrections for them to the conference means in other terminals through the conference control device 1, thereby providing an environment in which users can hold a conference with other participants. In particular, as a processing associated with the document distribution, the conference means 25 controls the participation permissive notification and the new participation notification. An example of a flow chart in the processing of the conference means 25 is shown in FIG. 8, and an arrangement of the conference information storage section 29 (refer to FIG. 7) on the storage device 24 used in the processing is shown in FIG. 9.

Figure 9:
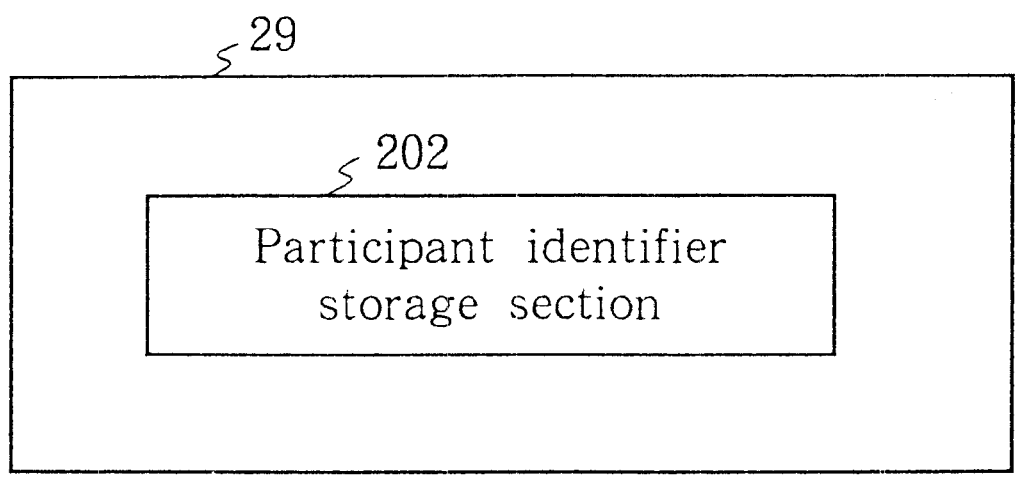
FIG. 9 is a diagram showing an arrangement of the conference information storage section.

Referring first to FIG. 9, the conference information storage section 29 is provided with a participant identifier storage section 202 storing its own participant identifier notified by the participation permissive notification from the conference control device 1 at the time of request for participation to the conference from this terminal.

Figure 8:
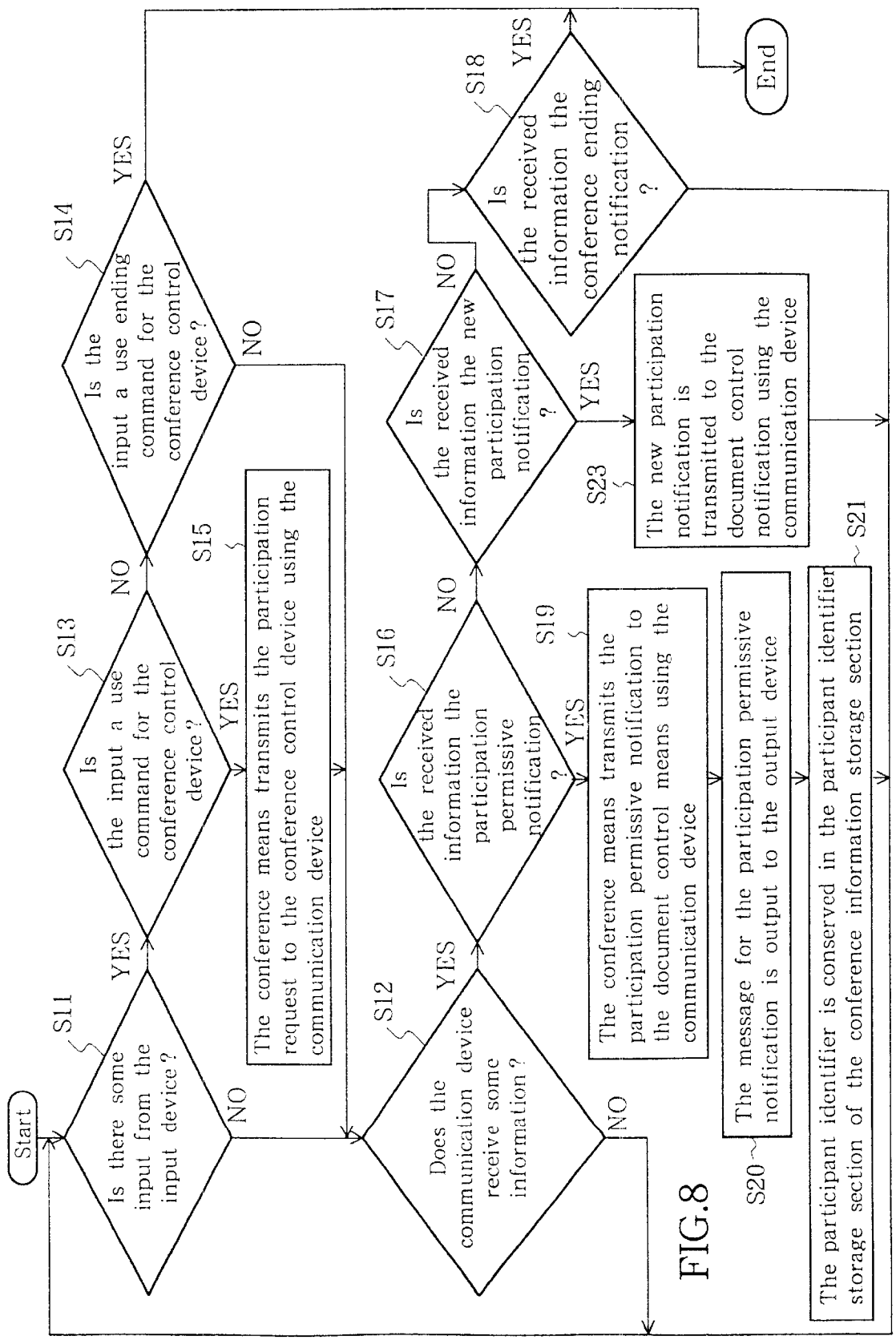
FIG. 8 is a flow chart showing a processing example of a conference means in the conference terminal.

Referring to FIG. 8, after started, the conference means 25 judges the presence of an input from the input device 22 and whether or not the communication device 27 receives some information (steps S11, S12). If there is some input from the input device 22 (Yes at step S11), it is judged whether the input is a use command or a use ending command for the conference control device 1 (steps S13, S14). If it is the use command for the conference control device 1 (Yes at step S13), the conference means 25 transmits the participation request to the conference control device 1 using the communication device 27 (step S15). And, if the input is the use ending command for the conference control device 1 (Yes at step S14), the conference means 25 completes the processing.

On the other hand, if the conference means 25 receives some information from the communication device 27 (Yes at step S12), it judges whether the information is the participation permissive notification, the new participation notification, or the conference ending notification (steps S16 to S18). When the information is the participation permissive notification (Yes at step S16), it transmits this participation permissive notification to the document control means 26 using the communication device 27 (step S19), outputs a message for the participation permissive notification to, for example, the display of the output device 23 (step S20), and conserves its own participant identifier notified by the participation permissive notification in the participant identifier storage section 202 in the conference information storage section 29 (step S21). Further, when the received content is the new participation notification (Yes at step S17), it transmits this new participation notification to the document control means 26 using the communication device 27 (step S23). On the other hand, when the received content is the conference ending notification (Yes at step S18), the conference means 25 completes the processing.

Figure 10:
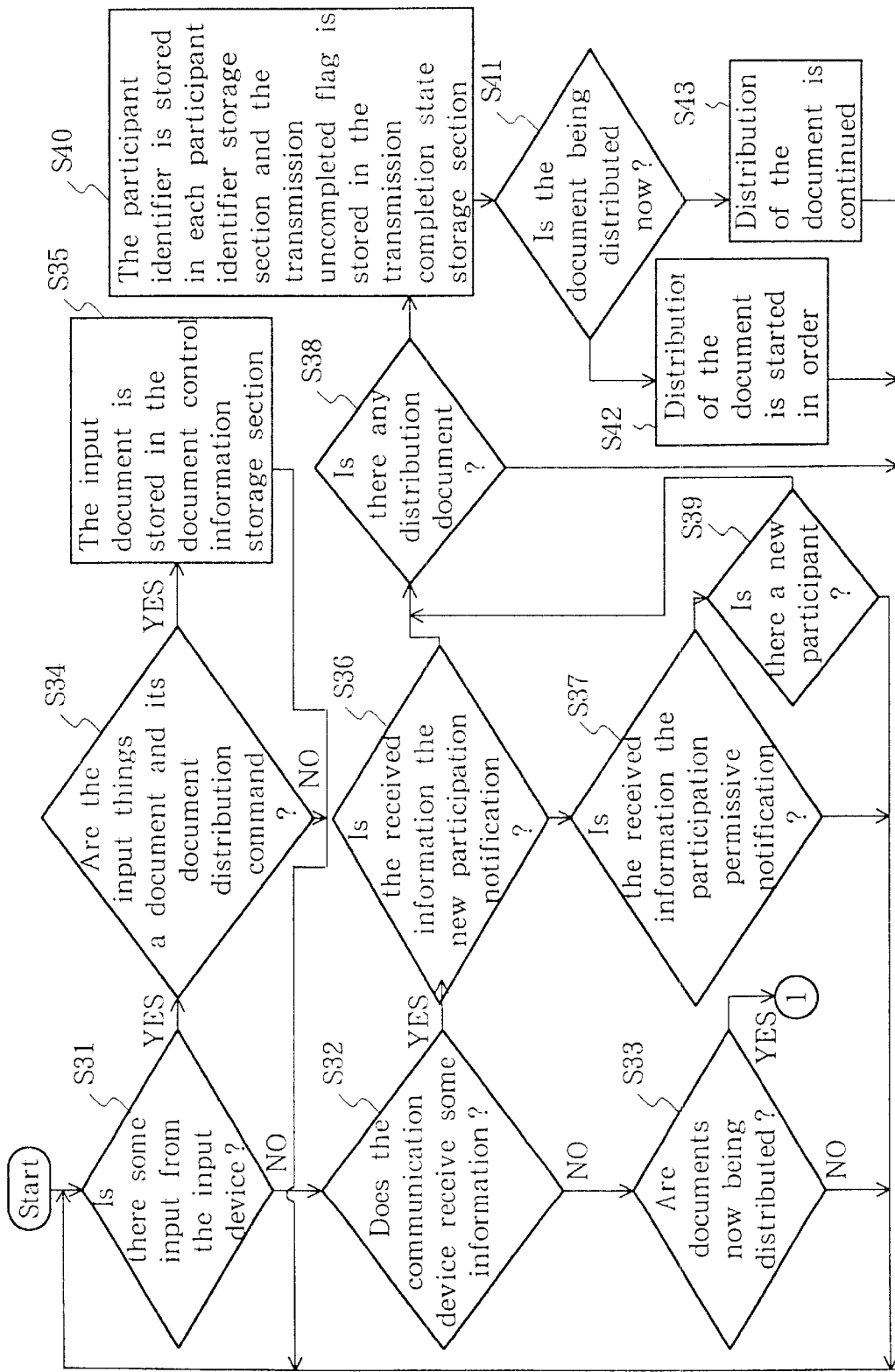
FIG. 10 is a flow chart showing a processing example of a document control means in the conference terminal.
Figure 11:
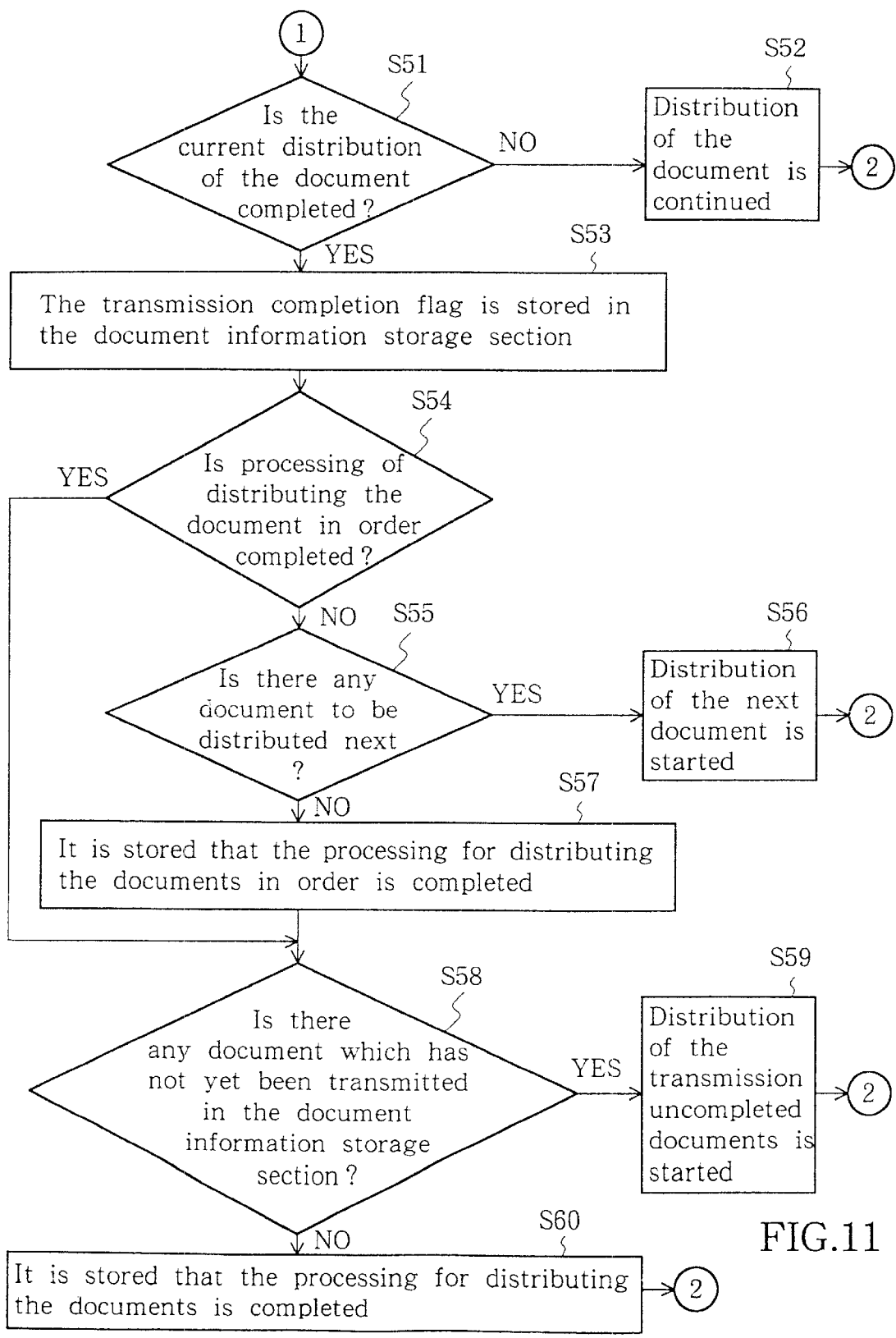
FIG. 11 is a flow chart showing a processing example of the document control means in the conference terminal.

The document control means 26 controls the distribution of the documents from this terminal to the other terminals. FIGS. 10 and 11 show flow charts of the processing of this part, and FIG. 12 shows an arrangement of a document control information storage section (refer to FIG. 7) on the storage device 24 used for the processing.

Figure 12:
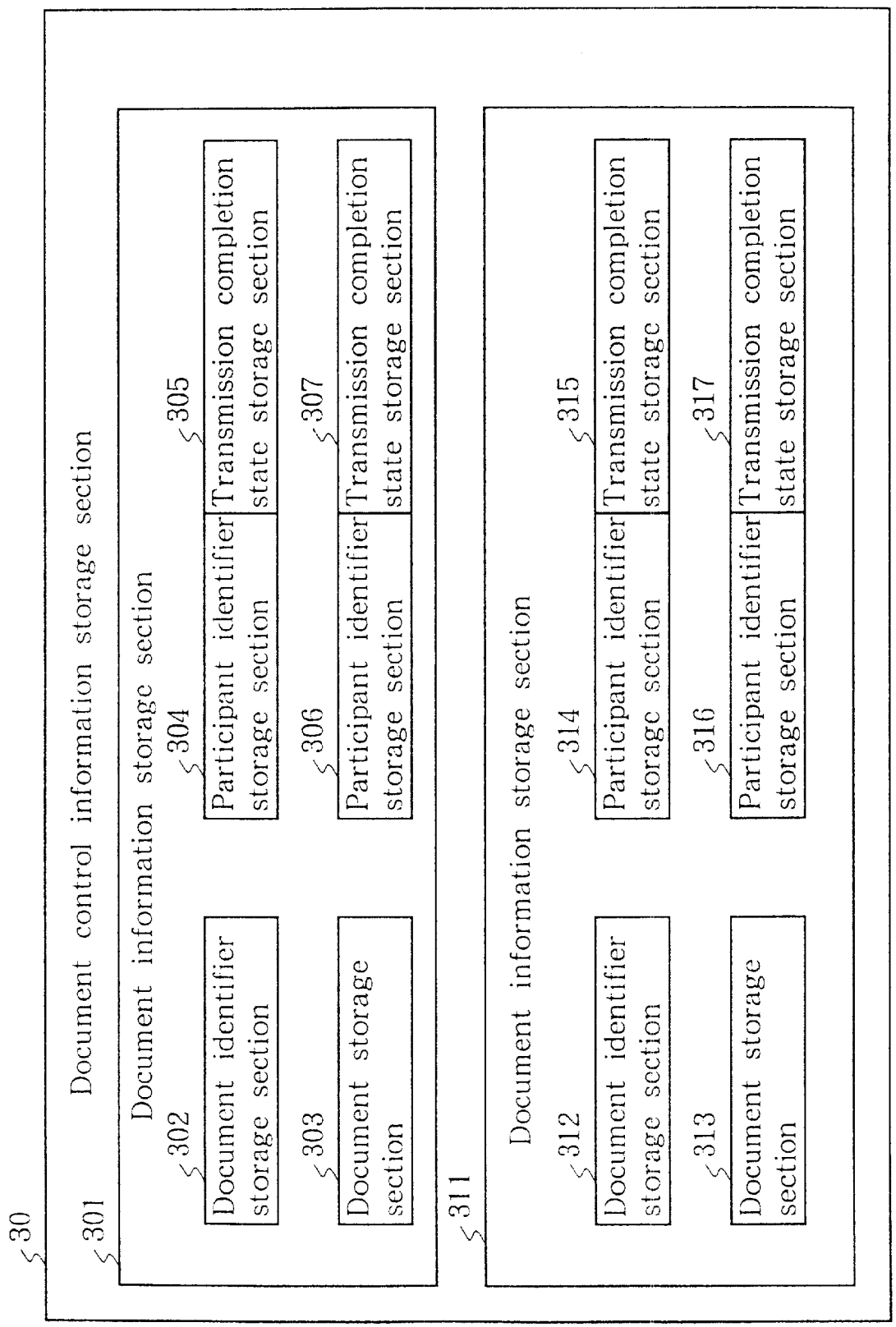
FIG. 12 is a diagram showing an arrangement of the document control information storage section.

Referring first to FIG. 12, the document control information storage section 30 is provided with document information storage sections for each document distributed from this terminal to other terminals. An example in which two distribution documents exist is shown in FIG. 12, and two document information storage sections 301, 311 are provided. Each of the document information storage sections 301, 311 has the same configuration, and is composed of document identifier storage sections 302, 312, document storage sections 303, 313, and a set of a participant identifier storage section and a transmission completion state storage section, the number of the set is equal to number of the terminals to be distributed. In the example of FIG. 12, the document information storage sections 301 includes a set of the participant identifier storage section 304 and the transmission completion state storage section 305 and a set of the participant identifier storage section 306 and the transmission completion state storage section 307, and the document information storage sections 311 includes a set of the participant identifier storage section 314 and the transmission completion state storage section 315 and a set of the participant identifier storage section 316 and the transmission completion state storage section 317.

Identifiers for identifying the conference records are stored in the document identifier storage sections 302, 312. The contents of the conference records to be distributed are stored in the document storage sections 303, 313. The identifiers of participants to which the conference records are distributed are stored in the participant identifier storage sections 304, 306, 314, and 316, and in the corresponding transmission completion state storage sections 305, 307, 315, and 317 flags indicating states of whether or not the conference records have been distributed to the corresponding participants are stored.

Referring to FIG. 10, after started, the document control means 26 judges whether input from the input device 22 exists, whether or not some information from the communication device 27 is received, and whether or not the documents are now being distributed (steps S31 to S33). When there is an input from the input device 22 (Yes at step S31), then it is judged whether or not the input things are a document and its distribution command (step S34), and if so, the input conference record is stored in the document control information storage section 30 (step S35). That is, referring to FIG. 12, one document information storage section (for example, 301) is produced for one conference record, and the input conference record is stored in the document storage section 303 and also its identifier is stored in the document identifier storage section 302.

Further, when a new participation notification is received from the conference means 25 through the communication device 27 (Yes at steps S32, S36), it is judged whether or not a distribution document exists according to whether or not at least one document information storage section exists in the document control information storage section 30 (step S38). When the distribution document exists, one set of the participant identifier storage section and the transmission completion state storage section is produced in all of the document information storage sections existing in the document control information storage section 30, and the identifier of the new participant notified by the new participation notification is stored in the participation identifier storage section and a transmission uncompleted flag is stored in the transmission completion state storage section (step S40). Then, it is judged whether or not the documents are now being distributed (step S41), and if not, the document control means 26 starts the processing of distributing the documents one by one (step S42), and if the documents are now being distributed, it continues the distribution of the documents (step S43). Here, that the processing of distributing the documents one by one is referred to as the processing in which, when there are two document information storage sections 301, 311 in the document control information storage section 30, firstly, the document in the forehand document information storage sections 301 is distributed and then the document in the document information storage sections 311 is distributed. And, at the time when the distribution of the last document in the document information storage sections 311 is completed, the processing of distributing the document one by one is also completed. However, as will be described below, since such a case that the processing of distributing the document is continued may occur, the processing of distributing the document is not necessarily completed even if the processing of distributing the document one by one is completed.

In addition, when the document control means 26 receives a participant permissive notification from the conference means 25 through the communication device 27 (Yes at steps S32, S36, and S37), it is judged whether or not the participant identifier of a participant already attending the conference is included in the participant permissive notification (step S39). If included, that is, if this terminal is the second or subsequent participant, the control continues to step S38 to examine whether or not a distribution document exists according to whether or not at least one document information storage section resides in the document control information storage section 30. And, if there is a distribution document, in step S40, a number, which is equivalent to that of the existing participants included in the participation permissive notification, of sets of the participant identifier storage section and the transmission completion state storage section are produced in all of the document information storage sections existing in the document control information storage section 30, and the participant identifiers of the existing participants notified by the participant permissive notification are stored in each of the participant identifier storage sections and the transmission uncompleted flags are stored in the transmission completion state storage sections. Then, the distribution of the documents is started in order (steps S41, S42).

On the other hand, when the document control means 26 is now distributing the documents (Yes at step S33), it performs the processing shown in FIG. 11. Firstly, it judges whether or not the current document distribution is completed (step S51), and if not, it continues the distribution (step S52). When the current document distribution is completed (Yes at step S51), the transmission completion flags are stored in the transmission completion state storage sections corresponding to the participants already completed the distribution this time in the sets of the participant identifier storage section and the transmission completion state storage section corresponding to the documents distributed this time (step S53). Next, it is judged whether or not the processing for distributing the documents in order is completed (step S54), and if completed, the control continues to step S58. If not, it is judged whether or not there are any documents to be distributed subsequently (step S55), and if there are any documents, the document control means 26 starts the distribution of the documents (step S56). If not, it stores inside that the processing for distributing the documents in order is completed (step S57) and continues to step S58.

In step S58, the document control means 26 again examines all document information storage sections in the document control information storage section 30 to check whether or not any documents exist in which the transmission uncompleted flags are stored in the transmission completion state storage sections. If some documents exist, it starts to distribute the documents to the participants with the transmission uncompleted flag for the documents (step S59). If not, it stores inside that the processing for distributing the documents is completed (step S60).

The operation of the present embodiment will be described with reference to specific examples. The following specific examples will be employed:

(i) Terminals 2, 3, and 3 are assumed to be used by participants Pb, Pc, and Pd, respectively, and a conference is assumed to be held by those three participants;

(ii) The participation order to the conference is assumed that the participant Pb firstly attends as a first participant, next, the participant Pc newly attends, and finally, the participant Pd newly attends;

(iii) It is assumed that there are two conference records of document DOC1 with document identifier ID1 and document DOC2 with document identifier ID2, which are provided by the participant Pb;

(iv) The timing when the participant Pd newly attends the conference is assumed while the participant Pb is distributing the document DOC1.

Incidentally, when reference characters for each of components of the terminal in FIG. 7, the conference information storage section 29 in FIG. 9, and the document control information storage section 30 are used, b for corresponding components of the terminal 2, c for corresponding components of the terminal 3, c for corresponding components of the terminal 3, and d for corresponding components of the terminal 4 are respectively attached to the backs of the reference characters. For example, the conference means of the terminal 2 is mentioned as "a conference means 25b".

Figure 13:
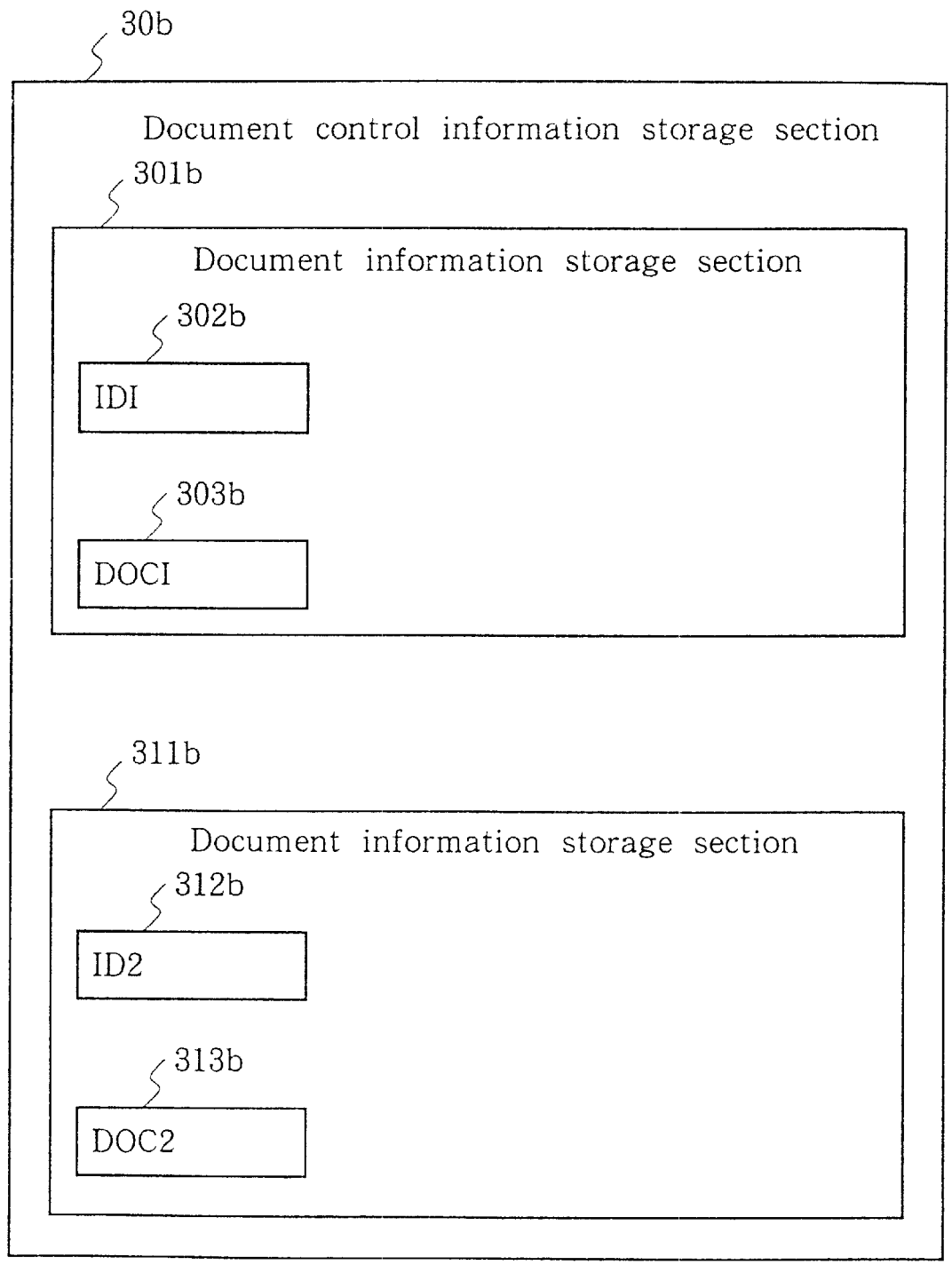
FIG. 13 is a diagram showing one example of a condition of the document control information storage section.

Firstly, when the participant Pb inputs the document DOCI and its distribution command to the document control means 26b by operating the input device 22b of the terminal 2 before a conference starts, the document control means 26b detects this input operation at step S34 in FIG. 10 to produce one document information storage section 301b in the document control information storage section 30b for the input document DOC1, store the document DOC1 in the document storage section 303b, and store the identifier ID1 of the document DOC1 in the document identifier storage section 302b (step S35). When the participant Pb inputs the residual document DOC2 and its distribution command, the similar operation is also performed. At this time, the state of the document control information storage section 30b is shown in FIG. 13.

Next, when the participant Pb operates the input device 22b of the terminal 2 to input a use command to the conference means 25b by assigning the conference control means 15 in the conference control device 1, the conference means 25b detects the command at step S13 in FIG. 8 to transmit a participation request to the conference control means 15 in the conference control device 1 using the communication device 27b (step S15).

This participation request is received in the communication device 17 of the conference control device 1 through the communication line 5 to be applied to the conference control means 15. When the conference control means 15 detects this request at step S2 in FIG. 3, it firstly produces the participant identifier IDPb, generates one participant information storage section 103 in the conference control information storage section 16, and stores the participant identifier IDPb in the participant identifier storage section 104 in the participant information storage section 103 (step S4). Next, it adds one to a value of the participant number storage section 102 to make the value one (step S5). Then, it transmits the participation permissive notification including the participant identifier IDPb to the conference means 25b of the terminal 2 using the communication device 17 (step S6). Since the participant of this time is the first one, transmission of a new participation notification is not performed (step S7).

The participation permissive notification described above is received in the communication device 27b of the conference terminal 2 through the communication line 5 to be applied to the conference means 25b. When the conference means 25b detects this notification at step S16 in FIG. 8, it transmits the participation permissive notification to the document control means 26b using the communication device 27b (step S19), outputs the message for the participation permissive notification to the output device 23b (step S20), and stores the participant identifier IDPb in the participant identifier storage section 202b of the conference information storage section 29b (step S21). At this time, the conference means 25b simultaneously notifies the participant identifier IDPb to the broadcast communication device 28b. The broadcast communication device 28b selectively receives a broadcast message including this participant identifier IDPb in the destination list in broadcast messages flowing through the broadcasting network 8.

Incidentally, when receiving the participation permissive notification described above through the communication device 27b (Yes at step S37), since a participant identifier of the existing participant is not included in the participation permissive notification (No at step S39), the document control means 26b processes nothing.

Then, when the participant Pc operates the input device 22c of the terminal 3 to input a use command to the conference means 25c by assigning the conference control means 15 of the conference control device 1, the conference means 25c detects the command at step S13 in FIG. 8 to transmit a participation request to the conference control means 15 in the conference control device 1 using the communication device 27c (step This participation request is received in the communication device 17 of the conference control device 1 through the communication line 6 to be applied to the conference control means 15. When the conference control means 15 detects this request at step S2 in FIG. 3, it firstly produces the participant identifier IDPc, generates one participant information storage section 113 in the conference control information storage section 16, and stores the participant identifier IDPc in the participant identifier storage section 114 in the participant information storage section 113 (step S4). Next, it adds one to the value of the participant number storage section 102 to make the value two (step S5). Then, it transmits the participation permissive notification including the participant identifier IDPc and the participant identifier IDPb of the participant Pb already attending the conference to the conference means 25c of the terminal 3 using the communication device 17 (step S6). Further, since the participant of this time is the second or subsequent one, it transmits a new participation notification including the participant identifier IDPc of the participant of this time to the conference means 25b in the terminal 2 of the participant Pb already attending the conference using the communication device 17 (step S7).

The participation permissive notification described above is received in the communication device 27c of the conference terminal 3 through the communication line 6 to be applied to the conference means 25c. When the conference means 25c detects this notification at step S16 in FIG. 8, it transmits the participation permissive notification to the document control means 26c using the communication device 27c (step S19), outputs the message for the participation permissive notification to the output device 23c (step S20), and stores the participant identifier IDPc in the participant identifier storage section 202c of the conference information storage section 29c (step S21). At this time, the conference means 25c simultaneously notifies the participant identifier IDPc to the broadcast communication device 28c. The broadcast communication device 28c selectively receives a broadcast message including this participant identifier IDPc in the destination list in broadcast messages flowing through the broadcasting network 8.

Incidentally, when receiving the participation permissive notification described above through the communication device 27c (Yes at step S37), although a participant identifier of the existing participant is included in its participation permissive notification (Yes at step S39), since there is no document to be distributed from its own terminal 3 (No at step S38), the document control means 26c processes nothing.

Further, the new participation notification described above transmitted from the conference control device 1 is received in the communication device 27b of the conference terminal 2 to be applied to the conference means 25b. When the conference means 25b detects this notification at step S17 in FIG. 8, it transmits the new participation notification to the document control means 26b using the communication device 27b (step S23).

Figure 14:
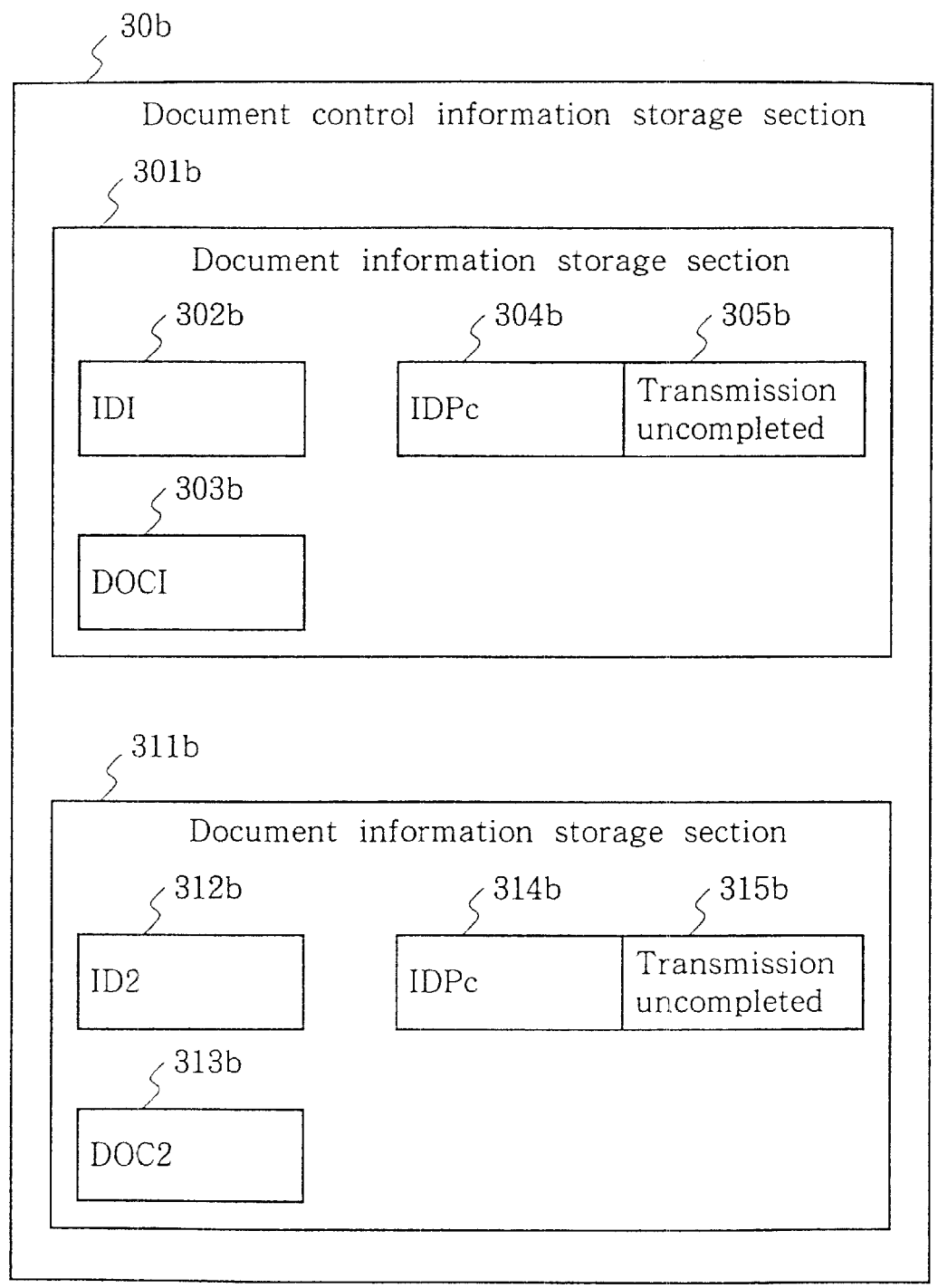
FIG. 14 is a diagram showing one example of a condition of the document control information storage section.

The document control means 26b receiving the new participation notification through the communication device 27b detects its reception at step S36 in FIG. 10. Since there are documents DOC1, DOC2 as distribution documents shown in FIG. 13 (Yes at step S38), the document control means 26b produces a set of a participant identifier storage section 304b and a transmission completion state storage section 305b in a document information storage section 301b to store the participant identifier IDPc in the former and the transmission uncompleted flag in the latter, respectively, and it generates a set of a participant identifier storage section 314b and a transmission completion state storage section 315b in a document information storage section 311b to store the participant identifier IDPc in the former and the transmission uncompleted flag in the latter, respectively (step S40). At this time, the document information storage section 301b shows a state indicated in FIG. 14. And, since the document control means 26b now is not distributing documents (No at step S41), it starts the processing for distributing the documents in order (step S42).

Firstly, the document control means 26b takes note of the headmost document information storage section 301b, and produces a broadcast message in which a destination list, all of the participant identifiers with the uncompleted transmission are listed up in sets of the participant identifier storage section and the transmission completion state storage section existing in the document information storage section 301b, is attached to a main communication message in which the document identifier ID1 read out from the document identifier storage section 302b is attached to the document DOC1 read out from the document storage section 303b. It broadcasts this broadcast message to the broadcasting network 8 using the broadcast communication device 28b. In a state in FIG. 14, there is only one set of participant identifier storage section 304b and the transmission completion state storage section 305b, and the transmission completion state storage section 305b is in a state of uncompleted transmission, so that only the participant identifier IDPc is included to the destination list. Incidentally, at this time, a transmitting flag is stored in the transmission completion state storage section 305b.

The communication message broadcast to the broadcasting network 8 described above includes the participant identifier IDPc in the destination list, so that it is received only in the broadcast communication device 28c of the terminal 3. The received ommunication message is sent from the broadcast communication device 28c to the document control means 26c, which stores the document DOC1 and the document identifier ID1 in the storage device 24c.

Next, the operation will be described in which the participant Pd newly participates while the document DOC1 is being distributed from the terminal 2 of the participant Pb.

When the participant Pd operates the input device 22d of the terminal 4 to input a use command to the conference means 25d by assigning the conference control means 15 of the conference control device 1, the conference means 25d detects the command at step S13 in FIG. 8 to transmit a participation request to the conference control means 15 in the conference control device 1 using the communication device 27d (step S15).

This participation request is received in the communication device 17 of the conference control device 1 through the communication line 7 to be applied to the conference control means 15. When the conference control means 15 detects this request at step S2 in FIG. 3, it firstly produces the participant identifier IDPd, generates one participant information storage section 123 in the conference control information storage section 16, and stores the participant identifier IDPd in the participant identifier storage section 124 in the participant information storage section 123 (step S4). Next, it adds one to the value of the participant number storage section 102 to make the value three (step S5). Then, it transmits the participation permissive notification including the participant identifier IDPd and the participant identifiers IDPb and IDPc of the participants Pb and Pc already attending the conference to the conference means 25d of the terminal 4 using the communication device 17 (step S6). Further, since the participant of this time is the second or subsequent one, it transmits a new participation notification including the participant identifier IDPd of the participant of this time to the conference means 25b and 25c in the terminals 2 and 3 of the participants Pb and Pc already attending the conference using the communication device 17 (step S7).

The participation permissive notification described above is received in the communication device 27d of the conference terminal 4 through the communication line 7 to be applied to the conference means 25d. When the conference means 25d detects this notification at step S16 in FIG. 8, it transmits the participation permissive notification to the document control means 26d using the communication device 27d (step S19), outputs the message for the participation permissive notification to the output device 23d (step S20), and stores the participant identifier IDPd in the participant identifier storage section 202d of the conference information storage section 29d (step S21). At this time, the conference means 25d simultaneously notifies the participant identifier IDPd to the broadcast communication device 28d. The broadcast communication device 28d selectively receives a broadcast message including this participant identifier IDPd in the destination list in broadcast messages flowing through the broadcasting network 8.

Incidentally, when receiving the participation permissive notification described above through the communication device 27d (Yes at step S37), although participant identifiers of the existing participants are included in its participation permissive notification (Yes at step S39), since there is no document to be distributed from its own terminal 4 (No at step S38), the document control means 26d processes nothing.

Figure 15:
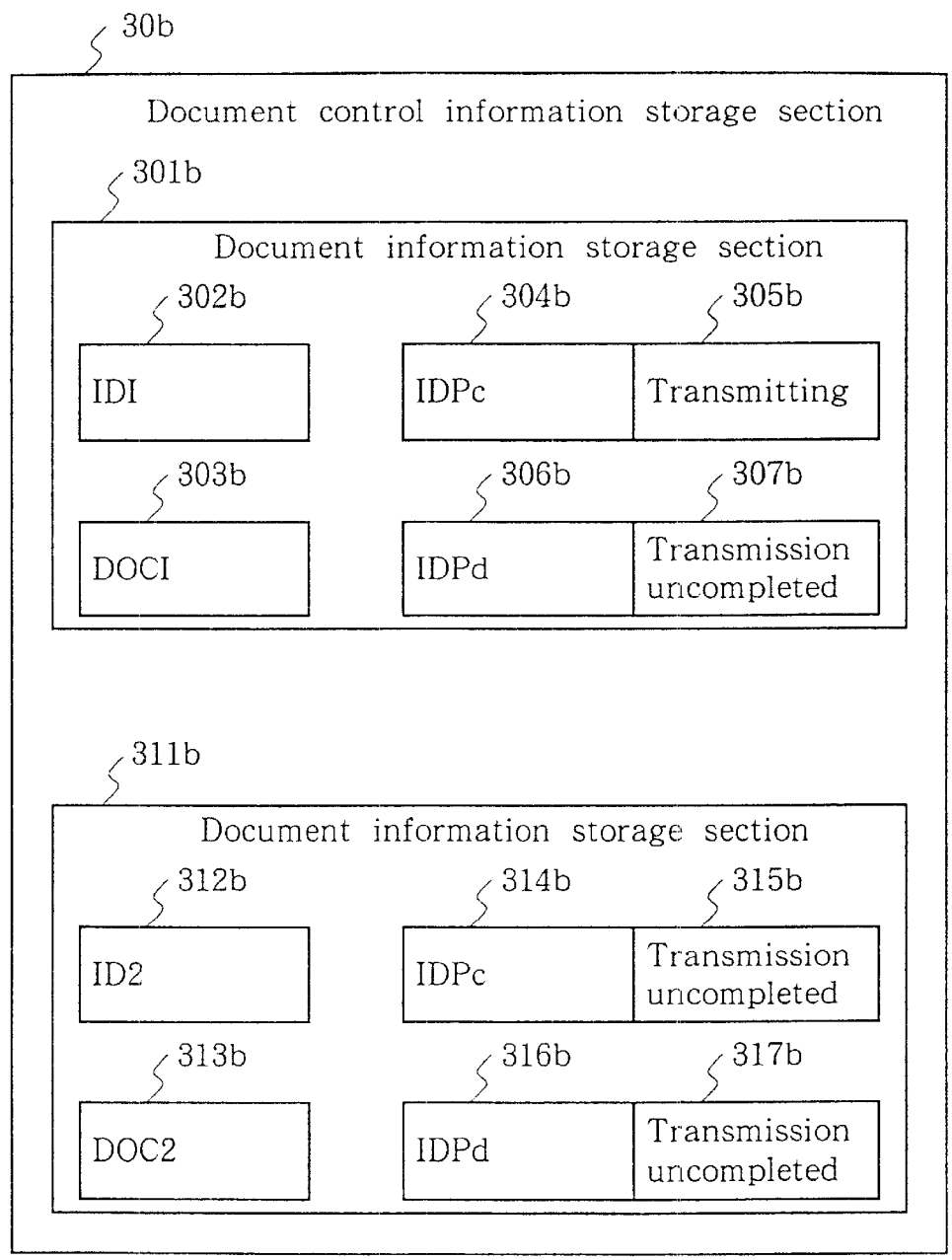
FIG. 15 is a diagram showing one example of a condition of the document control information storage section.

Further, the new participation notification described above transmitted from the conference control device 1 through the communication line 5 is received in the communication device 27b of the conference terminal 2 to be applied to the conference means 25b. When the conference means 25b detects this notification at step S17 in FIG. 8, it transmits the new participation notification to the document control means 26b using the communication device 27b (step S23). The document control means 26b receiving the new participation notification detects its reception at step S36 in FIG. 10. Since there are documents DOC1, DOC2 as distribution documents shown in FIG. 14 (Yes at step S38), the document control means 26b produces a set of a participant identifier storage section 306b and a transmission completion state storage section 307b in a document information storage section 301b to store the participant identifier IDPd in the former and the transmission uncompleted flag in the latter, respectively, and it generates a set of a participant identifier storage section 316b and a transmission completion state storage section 317b in a document information storage section 311b to store the participant identifier IDPd in the former and the transmission uncompleted flag in the latter, respectively (step S40). At this time, the document information storage section 301b shows a state indicated in FIG. 15. And, since the document control means 26b is now distributing documents (Yes at step S41), it continues the distribution of the documents (step S43).

On the other hand, the new participation notification described above transmitted from the conference control device 1 through the communication line 6 is received in the communication device 27c of the conference terminal 3 to be applied to the conference means 25c. When the conference means 25c detects this notification at step S17 in FIG. 8, it transmits the new participation notification to the document control means 26c using the communication device 27b (step S23). Although the document control means 26c receiving this new participation notification detects this notification at step S36 in FIG. 10, since there is no document to be distributed from its own terminal 3 (No at step S38), it processes nothing.

Figure 16:
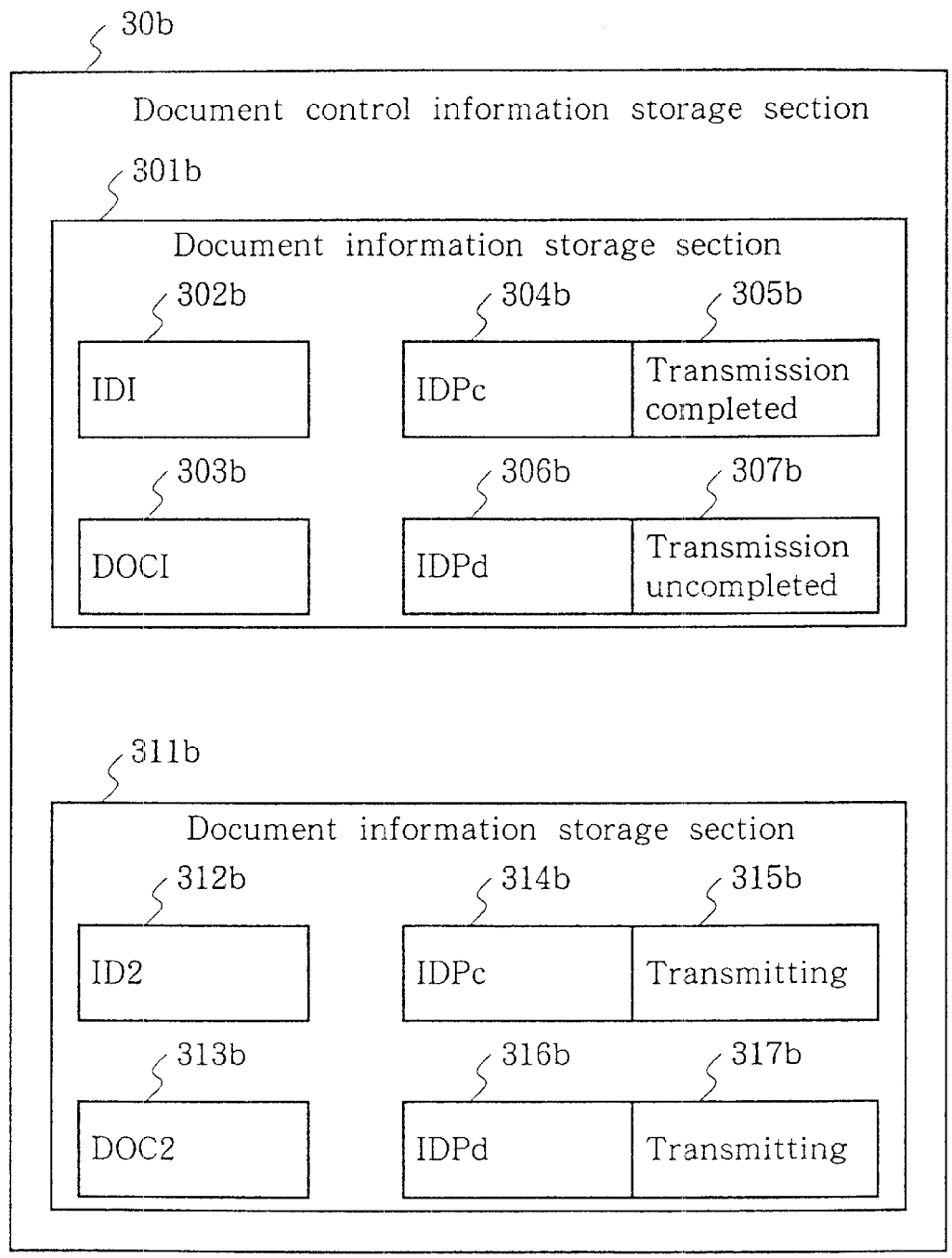
FIG. 16 is a diagram showing one example of a condition of the document control information storage section.

Then, when the distribution of the document DOC1 in the terminal 2 is completed in the broadcast communication device 28b (Yes at step S51 in FIG. 11), the document control means 26b stores transmission completion flags in all of the transmission completion state storage sections 305b in which transmitting flags are set up in the document information storage section 301b corresponding to the document DOC1 of the document control information storage section 30b (step S53). Then, it examines whether or not it is stored inside that the processing for distributing documents in order is completed (step S54). In this case, since it has not yet been stored, the document control means 26b examines whether or not there are any documents to be distributed (step S55). In this case, since there is the document DOC2, it starts the distribution of the document DOC2 (step S56). Specifically, the document control means 26b takes note of the headmost document information storage section 311b, and produces a broadcast message in which a destination list, all of the participant identifiers with the uncompleted transmission are listed up in sets of the participant identifier storage section and the transmission completion state storage section existing in the document information storage section 311b, is attached to a main communication message in which the document identifier ID2 read out from the document identifier storage section 312b is attached to the document DOC2 read out from the document storage section 313b, and broadcasts this broadcast message to the broadcasting network 8 using the broadcast communication device 28b. In a state in FIG. 15, there are two sets of the participant identifier storage sections 314b, 316b and the transmission completion state storage sections 315b, 317b, and the transmission completion state storage sections 315b, 317b are in a state of uncompleted transmission, so that the participant identifiers IDPc, IDPd are included to the destination list. And also, at this time, the transmitting flags are stored in the transmission completion state storage sections 305b, 317b. The state of the document control information storage section 30b at this time is shown in FIG. 16.

The communication message broadcast to the broadcasting network 8 described above includes the participant identifiers IDPc, IDPd in the destination list, so that it is received in both of the broadcast communication device 28c of the terminal 3 and the broadcast communication device 28d of the terminal 4. The received communication messages are sent from the broadcast communication devices 28c, 28d to the document control means 26c, 26d, which store the document DOC2 and the document identifier ID2 in the storage devices 24c, 24d.

Figure 17:
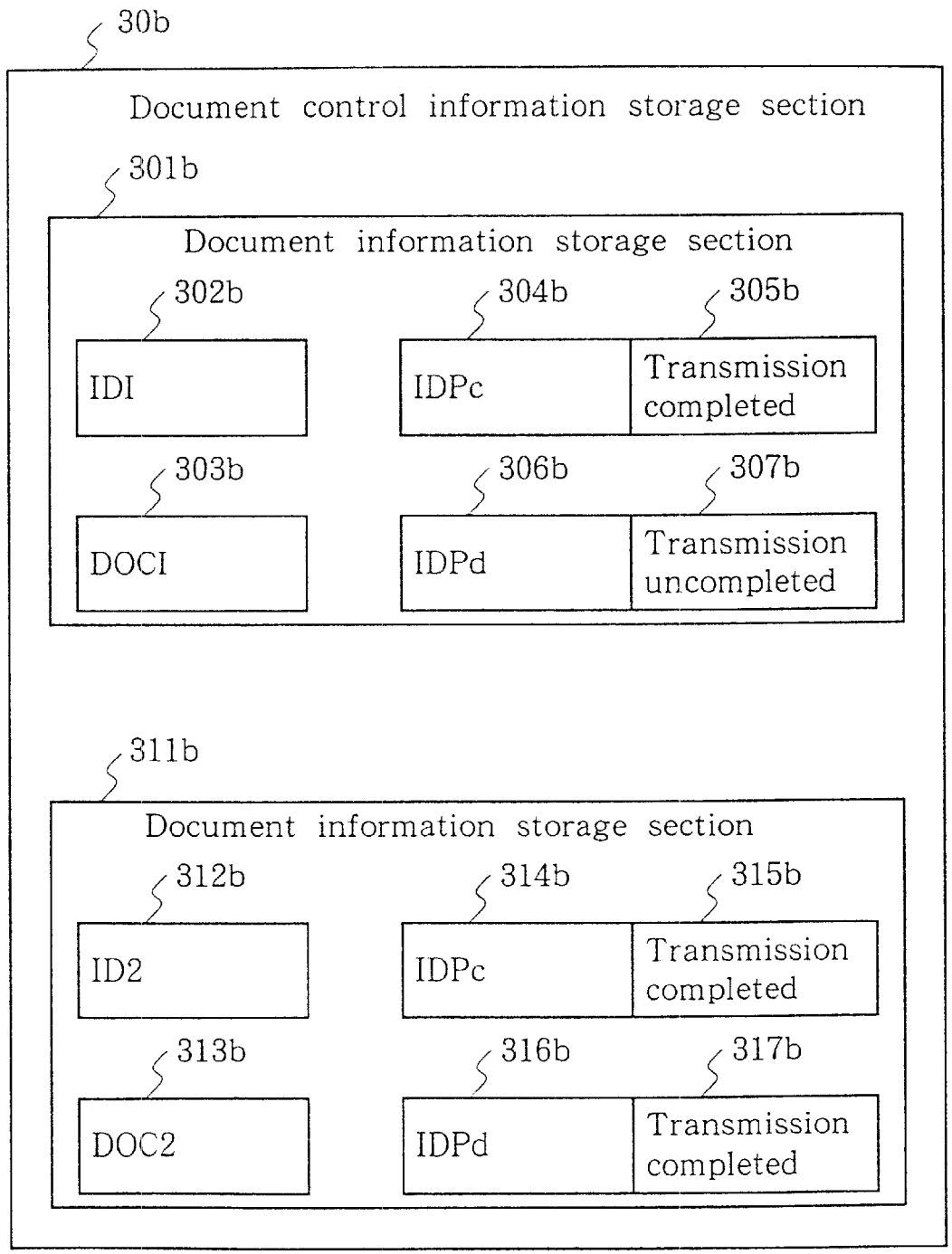
FIG. 17 is a diagram showing one example of a condition of the document control information storage section.

Then, when the distribution of the document DOC2 in the terminal 2 is completed in the broadcast communication device 28b (Yes at step S51 in FIG. 11), the document control means 26b stores transmission completion flags in all of the transmission completion state storage sections 315b, 317b in which transmitting flags are set up in the document information storage section 311 corresponding to the document DOC2 of the document control information storage section 30b (step S53). The state of the document control information storage section 30b at this time is shown in FIG. 17. Then, since it has not yet been stored inside that the processing for distributing documents in order is completed (No at step S54), the document control means 26b examines whether or not there are any documents to be distributed (step S55), however, in this case, there is no document to be distributed other than the documents DOC1, DOC2. Then, it stores inside that processing for distributing documents in order has been completed (step S57) and progresses to step S58. In step S58, the document control means 26 again examines all document information storage sections 301b, 311b in the document control information storage section 30b to check whether or not any documents exist in which the transmission uncompleted flags are stored in the transmission completion information storage sections 305b, 307b, 315b, and 317b. In a case of FIG. 17, the transmission uncompleted flag is set up in the transmission completion information storage section 307b corresponding to the participant identifier IDPd in the document information storage section 301b of the document DOC1. Then, the document control means 26b continues to step S59 to start the distribution of the document DOC1. Specifically, the document control means 26b produces a broadcast message in which a destination list including the participant identifier IDPd with the uncompleted transmission in sets of the participant identifier storage section and the transmission completion state storage section existing in the document information storage section 301b is attached to a main communication message in which the document identifier ID2 read out from the document identifier storage section 312b is attached to the document DOC2 read out from the document storage section 313b, and broadcasts this broadcast message to the broadcasting network 8 using the broadcast communication device 28b. And also, at this time, the transmitting flags are stored in the transmission completion state storage sections 317b.

The communication message broadcast to the broadcasting network 8 described above includes the participant identifier IDPd in the destination list, so that it is received in the broadcast communication device 28d of the terminal 4. The received communication message is sent from the broadcast communication devices 28d to the document control means 26d, which store the document DOC1 and the document identifier ID1 in the storage devices 24d.

Figure 18:
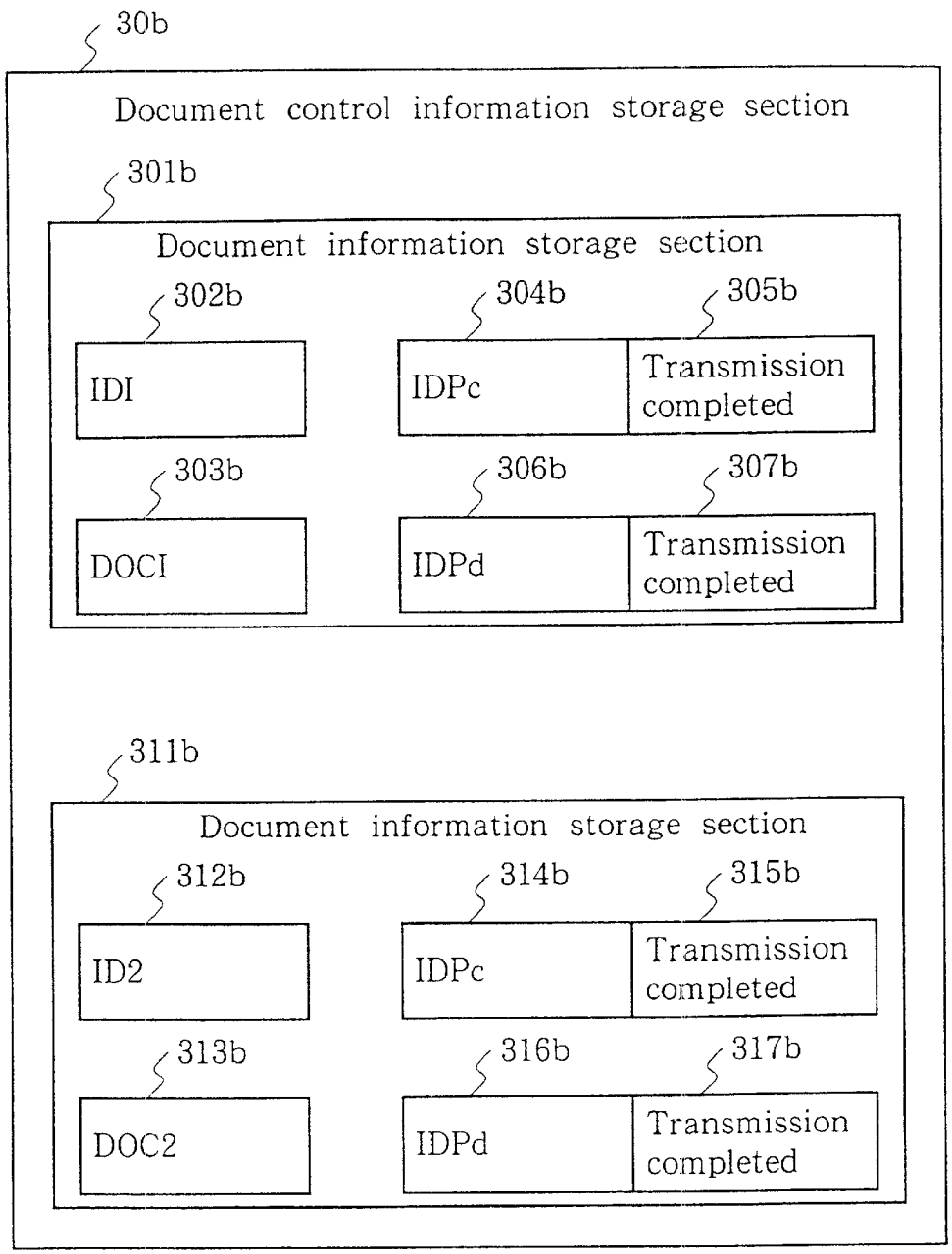
FIG. 18 is a diagram showing one example of a condition of the document control information storage section.

When the distribution of the document DOC1 in the terminal 2 is completed in the broadcast communication device 28b (Yes at step S51 in FIG. 11), the document control means 26b stores transmission completion flags in all of the transmission completion state storage sections in which transmitting flags are set up in the document information storage section 301 corresponding to the document DOC1 of the document control information storage section 30b (step S53). The state of the document control information storage section 30b at this time is shown in FIG. 18. Then, since it has been stored inside that the processing for distributing documents in order is completed (Yes at step S54), the document control means 26b continues to step S58 to examine again whether or not there are any documents which have not been transmitted, however, in a case of FIG. 18, since there is no document, the document control means 26b eliminates the inside storage about completion of distributing the document in order, and alternatively stores inside that the distribution of the document is completed (step S60).

In the example described above, when the terminal 2 distributes the documents DOC1, DOC2 to other terminals 3, 4, the distribution in the whole conference system is completed by the three transmissions of the broadcast transmission of the document 1 from the terminal 2, the broadcast transmission of the document 2 from the terminal 2, and the broadcast transmission of the document 1 from the terminal 2. On the other hand, as seen, for example, in Japanese Patent Laid-Open Publication No. Hei 7-322,230, when documents transmitted from each terminal are separately distributed to other terminals through the conference control device, a total of six transmissions, the transmissions of the document DOC1 and document DOC2 from the terminal 2, the transmissions of the document DOC1 and document DOC2 from the conference control device 1 to the terminal 3, and the transmissions of the document DOC1 and document DOC2 from the conference control device 1 to the terminal 4. Further, as seen in the column of Description of the Related Art in Japanese Patent Laid-Open Publication No. Hei 7-321,932, even if each terminal distributes conference records to a plurality of terminals by the broadcast transmission, when an efficient distribution is not realized when a new participant joins during the broadcast transmission, a total of four transmissions, the broadcast transmission of the document DOC1 from the terminal 2 to the terminal 3, the broadcast transmission of the document DOC2 from the terminal 2 to the terminal 3, the broadcast transmission of the document DOC1 from the terminal 2 to the terminal 4, and the broadcast transmission of the document DOC2 from the terminal 2 to the terminal 4, are required.

In the examples described above, although only the participant Pb who first participates the conference distributes the conference record, the participants Pc, Pd who participate second or subsequence can also uniquely distribute the conference records. For example, an example when the participant Pd who has last participated the conference distributes the document DOC3 will be described below.

Prior to participating the conference, when the participant Pd inputs the document DOC3 and its distribution command to the document control means 26b by operating the input device 22b of the terminal 4, the document control means 26d detects this input operation at step S34 in FIG. 10 to produce one document information storage section 301d in the document control information storage section 30d for the input document DOC3, store the document DOC3 in the document storage section 303d, and store the identifier ID3 of the document DOC3 in the document identifier storage section 302d (step S35).

Then, when the participant Pd operates the input device 22d of the terminal 4 to input the use command to the conference means 25d by assigning the conference control means 15 of the conference control device 1, the conference means 25d detects the command at step S13 in FIG. 8 to transmit the participation request to the conference control means 15 in the conference control device 1 using the communication device 27d (step S15).

This participation request is received in the communication device 17 of the conference control device 1 through the communication line 7 to be applied to the conference control means 15. When the conference control means 15 detects this request at step S2 in FIG. 3, it firstly produces the participant identifier IDPd, generates one participant information storage section 123 in the conference control information storage section 16, and stores the participant identifier IDPd in the participant identifier storage section 124 in the participant information storage section 123 (step S4). Next, it adds one to the value of the participant number storage section 102 to make the value three (step S5). Then, it transmits the participation permissive notification including the participant identifier IDPd and the participant identifiers IDPb and IDPc of the participants Pb and Pc already attending the conference to the conference means 25d of the terminal 4 using the communication device 17 (step S6). Further, since the participant of this time is the second or subsequent one, it transmits a new participation notification including the participant identifier IDPd of the participant of this time to the conference means 25b and 25c in the terminals 2 and 3 of the participants Pb and Pc already attending the conference using the communication device 17 (step S7).

The participation permissive notification described above is received in the communication device 27d of the conference terminal 4 through the communication line 7 to be applied to the conference means 25d. When the conference means 25d detects this notification at step S16 in FIG. 8, it transmits the participation permissive notification to the document control means 26d using the communication device 27d (step S19), outputs the message for the participation permissive notification to the output device 23d (step S20), and stores the participant identifier IDPd in the participant identifier storage section 202d of the conference information storage section 29d (step S21). At this time, the conference means 25d simultaneously notifies the participant identifier IDPd to the broadcast communication device 28d. The broadcast communication device 28d selectively receives a broadcast message including this participant identifier IDPd in the destination list in broadcast messages flowing through the broadcasting network 8.

When receiving the participation permissive notification described above through the communication device 27d (Yes at step S37), since the participant identifiers of the existing participants are included in its participation permissive notification (Yes at step S39), the document control means 26d produces a number, which is equivalent to that of the existing participants included in the participation permissive notification, of sets of the participant identifier storage section and the transmission completion state storage section in all of the document information storage sections 301d existing in the document control information storage section 30b, and stores the participant identifiers IDPb, IDPc of the existing participants notified by the participant permissive notification in each of the participant identifier storage sections and the transmission uncompleted flags in the transmission completion state storage sections. Then, the distribution of the documents is started in order (steps S41, S42). Accordingly, the document DOC3 is broadcast from the terminal 4 to the terminals 2, 3 through the broadcasting network 8.

Figure 19:
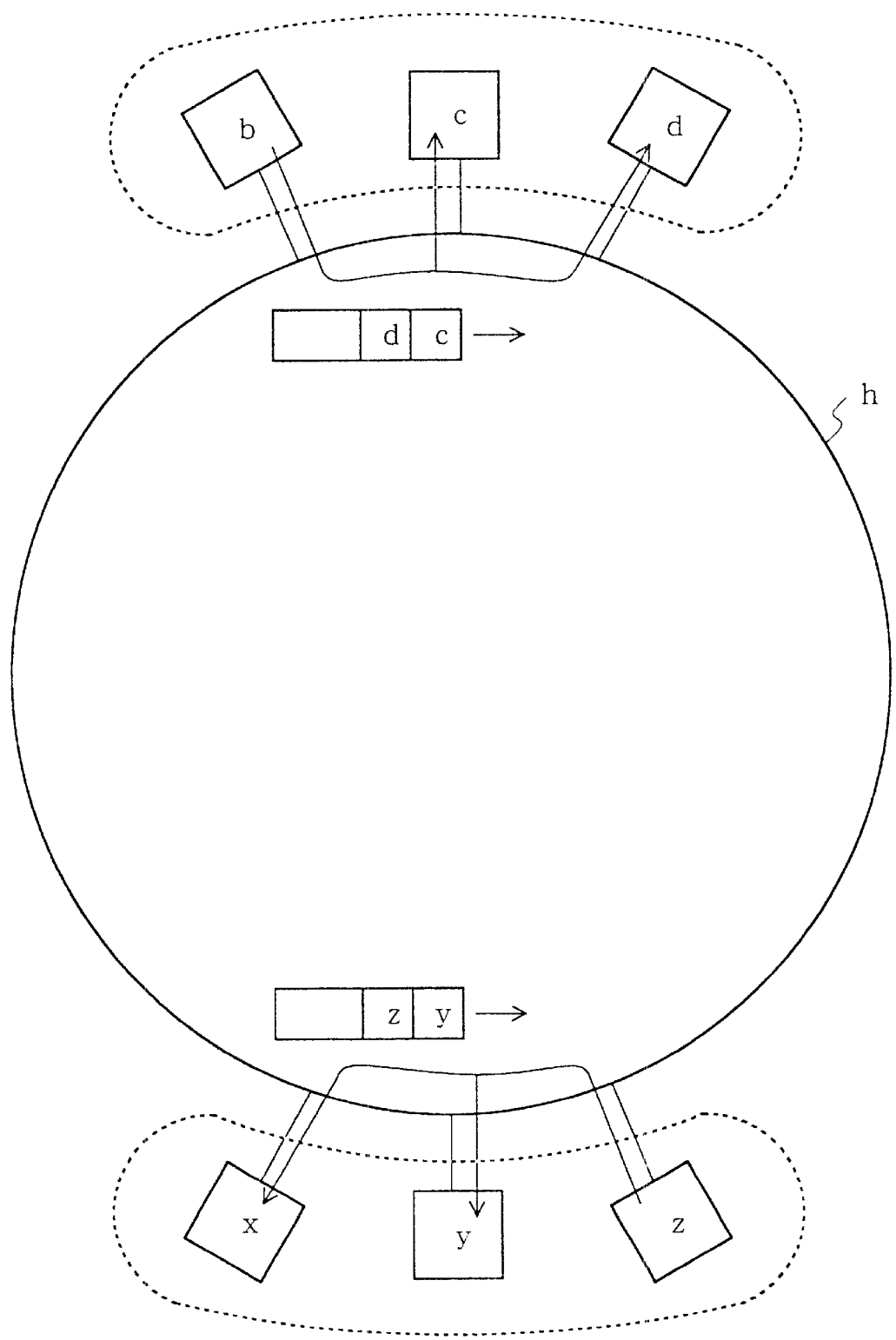
FIG. 19 is a diagram showing a manner of distribution of conference records when a plurality of conferences are held simultaneously in terminals connected to the same broadcasting network.

FIG. 19 shows a manner of distribution of conference records when a plurality of conferences are held simultaneously in terminals connected to the same broadcasting network 8. In FIG. 19, terminals 2, 3, and 4 are holding one conference, and terminals x, y, and z are executing the other conference. In this case, participant identifiers assigned to the terminals 3, 4 are included in a destination list, so that conference records broadcast from the terminal 2 are received in the terminals 3, 4 and are not received in the other terminals x, y, and z. Similarly, since participant identifiers assigned to the terminals y, z are included in a destination list, so that conference records broadcast from the terminal x are received in the terminals y, z and are not received in the other terminals 2, 3, and 4.

Although the embodiments according to the present invention have been described, the present invention is not limited to the embodiments described above, and it will be understood that various changes may be made therein. For example, such a configuration is possible that the conference control device 1 is made to be provided with the same terminal functions as the terminals 2, 3, and 4 (the conference means 25, the document control means 26, the input device 22, the output device 23, and the like) so that a user Pa of a terminal a attends the conference as one participant.

As set forth hereinabove, according to the present invention, the following effects can be obtained.

The distribution of the conference records is made possible without obstructing transmission of the real-time data such as cine image data and voice data, because the conference records are distributed using another communication line.

Loads in the conference control device can be reduced, because the conference records are made to be distributed without passing through the conference control device.

Even if a new participant may join while a broadcast communication is executed, a total amount of the broadcast communication can be reduced. The reason is that, when a new participant may join while the conference records are being broadcast one by one to the known participants, the distribution processing is made to be continued with including the new participant as a destination for the subsequent distribution documents, and at the time when the broadcast of the last conference records is completed, the conference records broadcast before the new participant joined are made to be broadcast to the new participant in turn.

What is claimed is:

1. A method for distributing documents in a conference system of a form in which conference terminals used by users who participate in a conference and conference control device with a function of distributing real-time data such as cine image data and voices transmitted from the conference terminals to other conference terminals participating in the conference are connected through first communication lines, said method for distributing documents in a conference system comprising:

broadcasting devices provided in each of the conference terminals, said broadcasting devices being connected by second communication lines different from the first communication lines; and wherein the conference terminals distributing conference records to the other conference terminals distribute the conference records to the other destination conference terminals by a broadcast using the broadcasting devices.

2. The method for distributing documents in a conference system according to claim 1, wherein said conference terminal distributing the conference records to the other conference terminals, when receiving a notification of a new participant from the conference control device while being distributing the conference records one by one to the known participants with a broadcast, continues distribution processing with including the new participant as a destination for subsequent distribution documents and, at the time when completing the broadcast of the last conference records, broadcasts the conference records broadcast before the new participant joined to the new participant in turn.

3. The method for distributing documents in a conference system according to claim 2, wherein said conference terminal distributing the conference records to the other conference terminals, each time when the conference terminal completes the distribution of one conference record with the broadcast, controls to which conference terminal the conference record has been distributed in a document control information section.

4. A method for distributing documents in a conference system of a form in which conference terminals used by users who participate in a conference and conference control device with a function of distributing real-time data such as cine image data and voices transmitted from the conference terminals to other conference terminals participating in the conference are connected through first communication lines, said method for distributing documents in a conference system is characterized in that:

the terminals are connected by second communication lines different from the first communication lines;

the conference control device, when receiving a participation request to the conference from the conference terminal through the first communication lines, if the conference terminal is a first participant to the conference, transmits a participation permissive notification including a participant identifier assigned to this conference terminal to the conference terminal of this first participant through the first communication lines, and if the conference terminal is not the first participant, the conference control device transmits the participation permissive notification including the participant identifier which is assigned to this conference terminal and the participant identifiers which have been assigned to the conference terminals already participating to the conference to the conference terminal of this participant through the first communication lines and also transmits a new participation notification including the participant identifier assigned to this conference terminal to the conference terminals already participating to the conference; and the conference terminal distributing conference records to the other conference terminals, each time when receiving a notification of the participant identifier of the other conference terminal from the conference control device by the participation permissive notification or the new participation notification, starts processing for distributing the conference records one by one by a broadcast communication through the second communication lines, and when receiving a notification of a new participant from the conference control device while distributing the conference records, the conference terminal continues distribution processing with including the new participant as a destination for subsequent distribution documents and, at the time when completing the broadcast communication of the last conference records, broadcasts the conference records broadcast before the new participant joined to the new participant in turn.

5. A computer readable storage medium in a conference system of a form in which conference terminals used by users who participate in a conference and conference control device with a function of distributing real-time data such as cine image data and voice data transmitted from the conference terminals to other conference terminals participating in the conference are connected through first communication lines and the terminals are connected by second communication lines different from the first communication lines, comprising:

a program which makes a data processor constituting the conference control device to function as a conference control means such that, when receiving a participation request to the conference from the conference terminal through the first communication lines, if the conference terminal is a first participant to the conference, the conference control means transmits a participation permissive notification including a participant identifier assigned to this conference terminal to the conference terminal of this first participant through the first communication lines, and if the conference terminal is not the first participant, the conference control means transmits the participation permissive notification including the participant identifier which is assigned to this conference terminal and the participant identifiers which have been assigned to the conference terminals already participating to the conference to the conference terminal of this participant through the first communication lines and also transmits a new participation notification including the participant identifier assigned to this conference terminal to the conference terminals already participating to the conference; and a program which makes a data processor constituting the conference terminal distributing conference records to the other terminals to function as a document control means such that, each time when receiving a notification of the participant identifier of the other conference terminal from the conference control device by the participation permissive notification or the new participation notification, the document control means starts processing for distributing the conference records one by one by a broadcast communication through the second communication lines, and when receiving a notification of a new participant from the conference control device while distributing the conference records, the document control means continues distribution processing with including the new participant as a destination for subsequent distribution documents and, at the time when completing the broadcast communication of the last conference records, broadcasts the conference records broadcast before the new participant joined to the new participant in turn.

* * * * *